US011191108B2

(12) United States Patent
Islam et al.

(10) Patent No.: US 11,191,108 B2
(45) Date of Patent: Nov. 30, 2021

(54) TWO STEP RANDOM-ACCESS CHANNEL (RACH) PROCEDURE IN MILLIMETER WAVE (MMW)

(71) Applicant: QUALCOMM Incorporated, San Diego, CA (US)

(72) Inventors: Muhammad Nazmul Islam, Edison, NJ (US); Junyi Li, Chester, NJ (US); Juergen Cezanne, Ocean Township, NJ (US); Tao Luo, San Diego, CA (US); Sundar Subramanian, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/707,520

(22) Filed: Sep. 18, 2017

(65) Prior Publication Data
US 2018/0139787 A1 May 17, 2018

Related U.S. Application Data

(60) Provisional application No. 62/421,841, filed on Nov. 14, 2016.

(51) Int. Cl.
*H04W 74/06* (2009.01)
*H04W 74/08* (2009.01)
(Continued)

(52) U.S. Cl.
CPC ...... *H04W 74/0891* (2013.01); *H04B 7/0617* (2013.01); *H04B 7/0626* (2013.01);
(Continued)

(58) Field of Classification Search
CPC .......... H04W 72/0413; Y02D 70/1262; H04L 5/0044
(Continued)

(56) References Cited

U.S. PATENT DOCUMENTS

| 9,537,548 B2 | 1/2017 | Thomas et al. |
| 2004/0001429 A1 | 1/2004 | Ma et al. |

(Continued)

FOREIGN PATENT DOCUMENTS

WO    WO-2016086144 A1    6/2016

OTHER PUBLICATIONS

Intel Corporation: "Random Access Procedure for NR", 3GPP Draft; R1-1611970 Random Access Procedure for NR, 3 Generation Partnership Project (3GPP), Mobile Competence Centre; 650, Route Des Lucioles; F-06921 Sophia-Antipolis Cedex; France, vol. RAN WG1, Reno, USA; XP051175934, Nov. 13, 2016 (Nov. 13, 2016).

(Continued)

*Primary Examiner* — Kiet M Doan
(74) *Attorney, Agent, or Firm* — Patterson + Sheridan, L.L.P.

(57) ABSTRACT

Certain aspects of the present disclosure provide techniques for random-access channel (RACH) communication. For example, certain aspects provide a method for wireless communication. The method generally includes transmitting a plurality of reference signals using one or more beams, and receiving at least one of a RACH preamble and or a RACH (Continued)

payload corresponding to one or more of the reference signals transmitted via at least one of the one or more beams.

29 Claims, 22 Drawing Sheets

(51) Int. Cl.
- *H04B 7/06* (2006.01)
- *H04L 5/00* (2006.01)
- *H04W 48/16* (2009.01)
- *H04W 72/04* (2009.01)

(52) U.S. Cl.
CPC ......... *H04B 7/0695* (2013.01); *H04L 5/0048* (2013.01); *H04L 5/0053* (2013.01); *H04W 48/16* (2013.01); *H04W 74/0833* (2013.01); *H04W 72/046* (2013.01)

(58) Field of Classification Search
USPC ....... 370/336, 280, 329, 331, 294, 252, 210; 455/68, 522, 435.3, 450, 436, 422.1, 455/456.1, 67.44; 340/372, 539.1
See application file for complete search history.

(56) References Cited

U.S. PATENT DOCUMENTS

| | | | | |
|---|---|---|---|---|
| 2009/0252125 | A1* | 10/2009 | Vujcic | H04W 56/0045 370/336 |
| 2013/0053055 | A1* | 2/2013 | Kumar | H04W 64/00 455/456.1 |
| 2013/0083753 | A1* | 4/2013 | Lee | H04W 74/0833 370/329 |
| 2014/0177607 | A1* | 6/2014 | Li | H04B 7/0617 370/336 |
| 2015/0289292 | A1* | 10/2015 | Sun | H04W 74/0833 370/329 |
| 2016/0029358 | A1 | 1/2016 | Hou et al. | |
| 2017/0006593 | A1 | 1/2017 | Liu | |
| 2017/0164211 | A1 | 6/2017 | Ho et al. | |
| 2017/0201974 | A1* | 7/2017 | Sohn | H04W 72/0413 |
| 2017/0366992 | A1* | 12/2017 | Rune | H04L 5/0016 |
| 2018/0123675 | A1* | 5/2018 | Shi | H04B 7/0695 |

OTHER PUBLICATIONS

International Search Report and Written Opinion—PCT/US2017/059904—ISA/EPO—dated Jan. 24, 2018.
Taiwan Search Report—TW106138275—TIPO—Feb. 27, 2021.

\* cited by examiner

TWO STEP RANDOM-ACCESS CHANNEL (RACH) PROCEDURE IN MILLIMETER WAVE (MMW)

CROSS-REFERENCE TO RELATED APPLICATIONS

This application claims benefit of priority to provisional application No. 62/421,841, filed Nov. 14, 2016, which is expressly incorporated herein by reference in its entirety.

INTRODUCTION

Aspects of the present disclosure relate to wireless communications, and more particularly, random-access channel (RACH) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication. The method generally includes transmitting a plurality of reference signals using one or more beams, and receiving at least one of a random-access channel (RACH) preamble and or a RACH payload corresponding to one or more of the reference signals transmitted via at least one of the one or more beams.

Certain aspects of the present disclosure provide a method for wireless communications. The method generally includes receiving a plurality of reference signals that are transmitted using one or more beams, determining at least one beam of the one or more beams for communicating at least one of a random-access channel (RACH) preamble or a RACH payload, and transmitting the at least one of the RACH preamble or the RACH payload based on the determination.

Certain aspects of the present disclosure provide a method for wireless communications. The method generally includes detecting a random-access channel (RACH) preamble that corresponds to one of a plurality of reference signals, wherein the plurality of reference signals are transmitted via one or more beams, determining a configuration for monitoring at least one of the beams corresponding to the detection of the RACH preamble, and monitoring the at least one of the beams based on the determination.

Certain aspects of the present disclosure provide an apparatus for wireless communication. The apparatus generally includes a transmitter configured to transmit a plurality of reference signals using one or more beams, and a receiver configured to receive at least one of a random-access channel (RACH) preamble and or a RACH payload corresponding to one or more of the reference signals transmitted via at least one of the one or more beams.

Certain aspects of the present disclosure provide an apparatus for wireless communications. The apparatus generally includes a receiver configured to receive a plurality of reference signals that are transmitted using one or more beams, a processing system configured to determine at least one beam of the one or more beams for communicating at least one of a random-access channel (RACH) preamble or a RACH payload, and a transmitter configured to transmit the at least one of the RACH preamble or the RACH payload based on the determination.

Certain aspects of the present disclosure provide an apparatus for wireless communications. The apparatus generally includes a processing system configured to detect a random-access channel (RACH) preamble that corresponds to one of a plurality of reference signals, wherein the plurality of reference signals are transmitted via one or more beams, and determine a configuration for monitoring at least one of the beams corresponding to the detection of the RACH preamble, and a detector configured to monitor the at least one of the beams based on the determination.

Certain aspects of the present disclosure provide an apparatus for wireless communication. The apparatus generally includes means for transmitting a plurality of reference signals using one or more beams, and means for receiving at least one of a random-access channel (RACH) preamble and or a RACH payload corresponding to one or more of the reference signals transmitted via at least one of the one or more beams.

Certain aspects of the present disclosure provide an apparatus for wireless communications. The apparatus generally includes means for receiving a plurality of reference signals that are transmitted using one or more beams, means for determining at least one beam of the one or more beams for communicating at least one of a random-access channel (RACH) preamble or a RACH payload, and means for transmitting the at least one of the RACH preamble or the RACH payload based on the determination.

Certain aspects of the present disclosure provide an apparatus for wireless communications. The apparatus generally includes means for detecting a random-access channel (RACH) preamble that corresponds to one of a plurality of reference signals, wherein the plurality of reference signals are transmitted via one or more beams, means for determining a configuration for monitoring at least one of the beams corresponding to the detection of the RACH preamble, and means for monitoring the at least one of the beams based on the determination.

Certain aspects of the present disclosure provide a computer-readable medium configured to transmit a plurality of reference signals using one or more beams, and receive at least one of a random-access channel (RACH) preamble and or a RACH payload corresponding to one or more of the reference signals transmitted via at least one of the one or more beams.

Certain aspects of the present disclosure provide a computer-readable medium configured to receive a plurality of reference signals that are transmitted using one or more beams, determine at least one beam of the one or more beams for communicating at least one of a random-access channel (RACH) preamble or a RACH payload, and transmit the at least one of the RACH preamble or the RACH payload based on the determination.

Certain aspects of the present disclosure provide a computer-readable medium configured to detect a random-access channel (RACH) preamble that corresponds to one of a plurality of reference signals, wherein the plurality of reference signals are transmitted via one or more beams, determine a configuration for monitoring at least one of the beams corresponding to the detection of the RACH preamble, and monitor the at least one of the beams based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
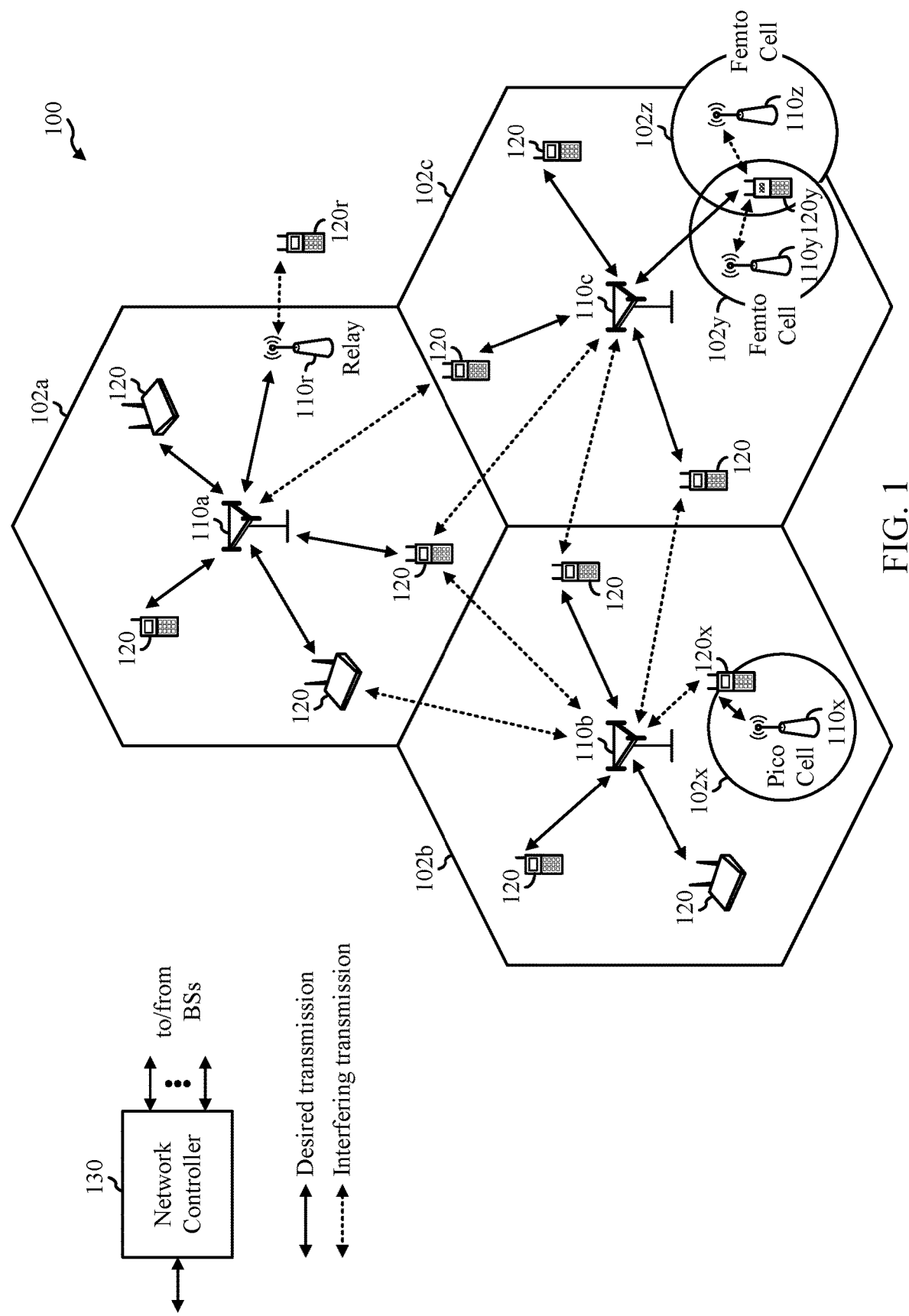
FIG. 1 is a block diagram conceptually illustrating an example telecommunications system, in accordance with certain aspects of the present disclosure.

Aspects of the present disclosure provide apparatus, methods, processing systems, and computer readable mediums for random-access channel (RACH) communication.

Certain aspects of the present disclosure may be applied to new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a access node function (ANF) device and a user-equipment function (UE) device communicate via active beams. In certain aspects, an ANF device may be a comprising a base station (BS) for an access network or a backhaul node with BS functionality for an integrated access backhaul system. In certain aspects, a UEF device may be a user-equipment (UE) for a access network or a backhaul node with UE functionality for an integrated access backhaul system. As described herein, an ANF device may monitor active beams using measurements of reference signals (e.g., MRS, CSI-RS, synch) transmitted via reference beams.

UEF devices 120 may be configured to perform the operations 1000 and methods described herein for detecting a mobility events based, at least in part, on mobility parameters associated with a beam set. ANF device 110 may comprise a transmission reception point (TRP), Node B (NB), 5G NB, access point (AP), new radio (NR) ANF device, etc.). ANF device 110 may be configured to perform the operations 900 and methods described herein for configuring beam sets and mobility parameters associated with each of the beam sets. The ANF device may receive an indication of a detected mobility event based on the mobility parameters and may make a decision regarding mobility management of the UEF device based on the event trigger.

As illustrated in FIG. 1, the wireless network 100 may include a number of BSs 110 and other network entities. A ANF device may be a station that communicates with UEF devices. Each ANF device 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR ANF device, NR ANF device, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A ANF device may provide communication coverage for a macro cell, a pico cell, a femto cell, and/or other types of cell. A macro cell may cover a relatively large geographic area (e.g., several kilometers in radius) and may allow unrestricted access by UEF devices with service subscription. A pico cell may cover a relatively small geographic area and may allow unrestricted access by UEF devices with service subscription. A femto cell may cover a relatively small geographic area (e.g., a home) and may allow restricted access by UEF devices having association with the femto cell (e.g., UEF devices in a Closed Subscriber Group (CSG), UEs for users in the home, etc.). An ANF device for a macro cell may be referred to as a macro ANF device. A ANF device for a pico cell may be referred to as a pico ANF device. An ANF device for a femto cell may be referred to as a femto ANF device or a home ANF device. In the example shown in FIG. 1, the BSs 110a, 110b and 110c may be macro ANF devices for the macro cells 102a, 102b and 102c, respectively. The ANF device 110x may be a pico BS for a pico cell 102x. The ANF devices 110y and 110z may be femto ANF device for the femto cells 102y and 102z, respectively. An ANF device may support one or multiple (e.g., three) cells.

The wireless network 100 may also include relay stations. A relay station is a station that receives a transmission of data and/or other information from an upstream station (e.g., an ANF device or a UEF device) and sends a transmission of the data and/or other information to a downstream station (e.g., a UEF device or an ANF device). A relay station may also be a UEF device that relays transmissions for other UEF devices. In the example shown in FIG. 1, a relay station 110r may communicate with the ANF device 110a and a UEF device 120r in order to facilitate communication between the ANF device 110a and the UEF device 120r. A relay station may also be referred to as a relay ANF device, a relay, etc.

The wireless network 100 may be a heterogeneous network that includes BSs of different types, e.g., macro ANF device, pico ANF device, femto ANF device, relays, etc. These different types of ANF devices may have different transmit power levels, different coverage areas, and different impact on interference in the wireless network 100. For example, macro ANF device may have a high transmit power level (e.g., 20 Watts) whereas pico ANF device, femto ANF device, and relays may have a lower transmit power level (e.g., 1 Watt).

The wireless network 100 may support synchronous or asynchronous operation. For synchronous operation, the ANF devices may have similar frame timing, and transmissions from different ANF devices may be approximately aligned in time. For asynchronous operation, the ANF devices may have different frame timing, and transmissions from different ANF devices may not be aligned in time. The techniques described herein may be used for both synchronous and asynchronous operation.

A network controller 130 may couple to a set of ANF devices and provide coordination and control for these ANF devices. The network controller 130 may communicate with the ANF devices 110 via a backhaul. The ANF devices 110 may also communicate with one another, e.g., directly or indirectly via wireless or wireline backhaul.

The UEF devices 120 (e.g., 120x, 120y, etc.) may be dispersed throughout the wireless network 100, and each UEF device may be stationary or mobile. A UEF device may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEF devices may be considered evolved or machine-type communication (MTC) devices or evolved MTC (eMTC) devices. MTC and eMTC UEF devices include, for example, robots, drones, remote devices, sensors, meters, monitors, location tags, etc., that may communicate with a ANF device, another device (e.g., remote device), or some other entity. A wireless node may provide, for example, connectivity for or to a network (e.g., a wide area network such as Internet or a cellular network) via a wired or wireless communication link. Some UEF devices may be considered Internet-of-Things (IoT) devices.

In FIG. 1, a solid line with double arrows indicates desired transmissions between a UEF device and a serving ANF device, which is a ANF device designated to serve the UEF device on the downlink and/or uplink. A dashed line with double arrows indicates interfering transmissions between a UEF device and a ANF device.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UEF device. Multi-layer transmissions with up to 2 streams per UEF device may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UEF device may function as a scheduling entity, scheduling resources for one or more subordinate entities (e.g., one or more other UEF devices). In this example, the UEF device is functioning as a scheduling entity, and other UEF devices utilize resources scheduled by the UEF device for wireless communication. A UEF device may function as a scheduling entity in a peer-to-peer (P2P) network, and/or in a mesh network. In a mesh network example, UEF devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR ANF device (e.g., gNB, 5G Node B, Node B, transmission reception point (TRP), access point (AP)) may correspond to one or multiple ANF devices. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR ANF devices may transmit downlink signals to UEF devices indicating the cell type. Based on the cell type indication, the UEF device may communicate with the NR ANF device. For example, the UEF device may determine NR ANF devices to consider for cell selection, access, handover, and/or measurement based on the indicated cell type.

Figure 2:
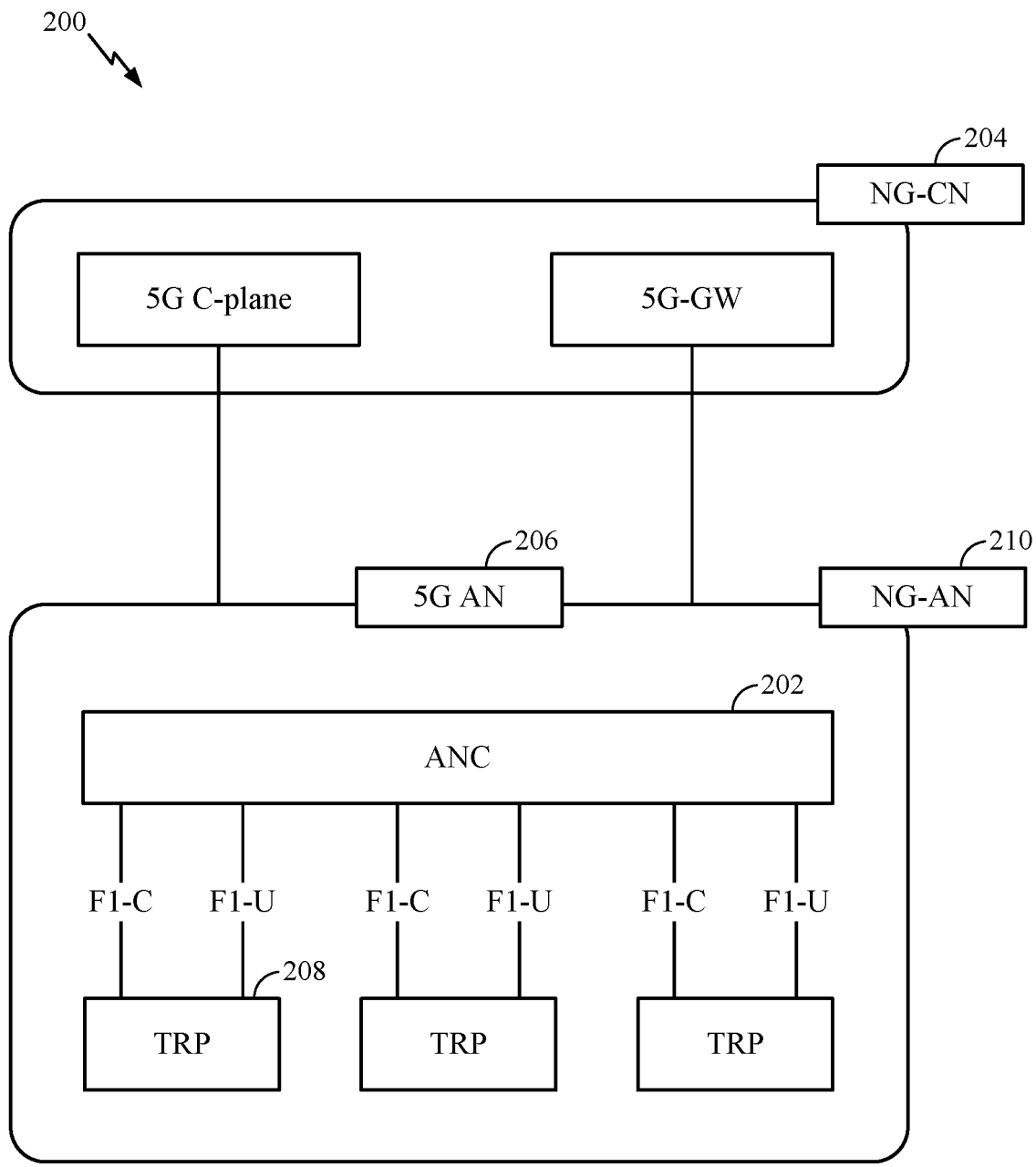
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as ANF devices, NR ANF devices, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific deployments, the TRP may be connected to more than one ANC. A TRP may include one or more antenna ports. The TRPs may be configured to individually (e.g., dynamic selection) or jointly (e.g., joint transmission) serve traffic to a UEF device.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, an ANF device may include a central unit (CU) (e.g., ANC 202) and/or one or more distributed units (e.g., one or more TRPs 208).

Figure 3:
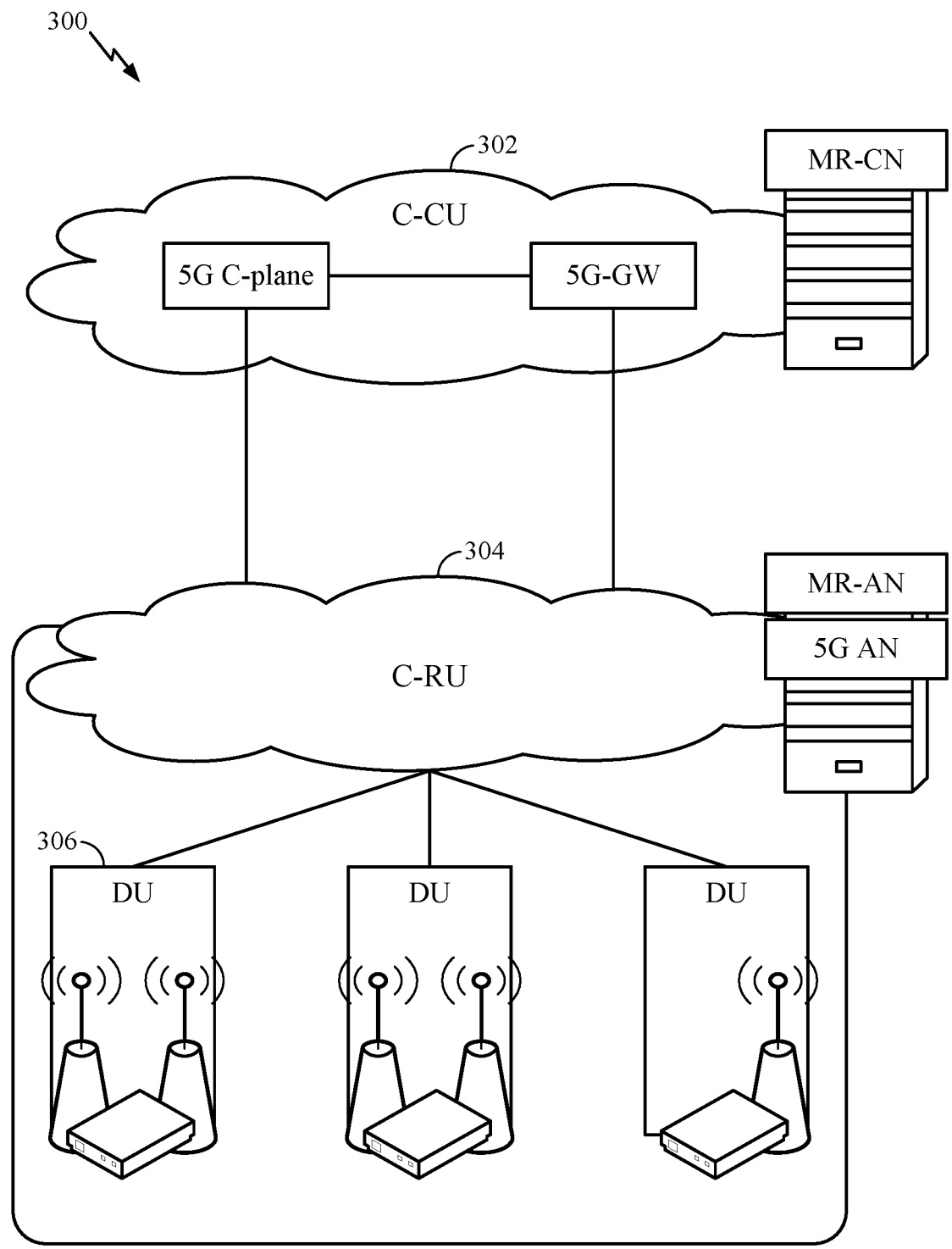
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
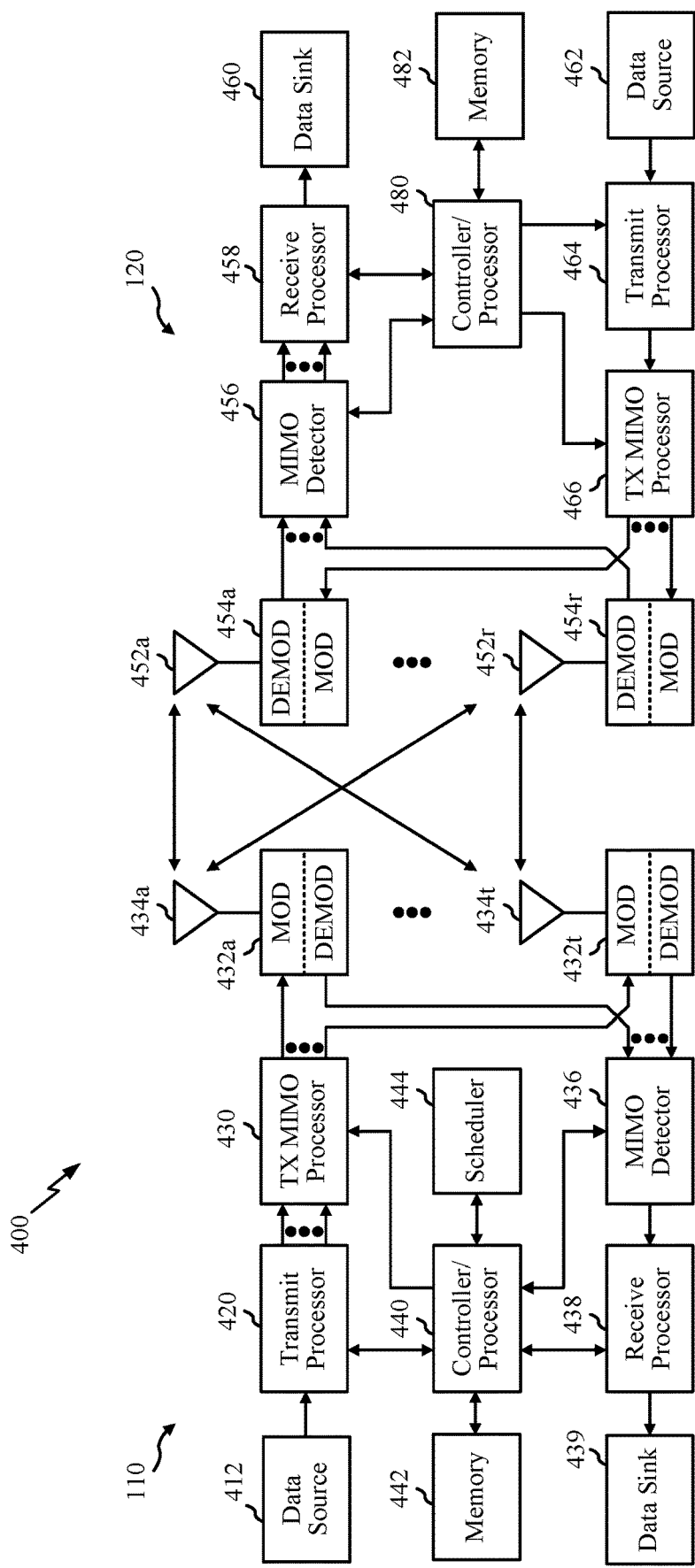
FIG. 4 is a block diagram conceptually illustrating a design of an example access node function (ANF) device and user equipment function (UEF) device, in accordance with certain aspects of the present disclosure.

FIG. 4 illustrates example components of the ANF device 110 and UEF device 120 illustrated in FIG. 1, which may be used to implement aspects of the present disclosure. The ANF device may include a TRP. One or more components of the ANF device 110 and UEF device 120 may be used to practice aspects of the present disclosure. For example, antennas 452, Tx/Rx 454, processors 466, 458, 464, and/or controller/processor 480 of the UEF device 120 and/or antennas 434, processors 420, 430, 438, and/or controller/processor 440 of the ANF device 110 may be used to perform the operations described herein and illustrated with reference to FIGS. 14-15, 19-22.

FIG. 4 shows a block diagram of a design of an ANF device 110 and a UEF device 120, which may be one of the ANF devices and one of the UEF devices in FIG. 1. For a restricted association scenario, the base station 110 may be the macro ANF device 110c in FIG. 1, and the UEF device 120 may be the UEF device 120y. The base station 110 may also be a base station of some other type. The base station 110 may be equipped with antennas 434a through 434t, and the UEF device 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UEF device 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UEF device 120 to a data sink 460, and provide decoded control information to a controller/processor 480.

On the uplink, at the UEF device 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the ANF device 110, the uplink signals from the UEF device 120 may be received by the antennas 434, processed by the modulators 432, detected by a MIMO detector 436 if applicable, and further processed by a receive processor 438 to obtain decoded data and control information sent by the UEF device 120. The receive processor 438 may provide the decoded data to a data sink 439 and the decoded control information to the controller/processor 440.

The controllers/processors 440 and 480 may direct the operation at the ANF device 110 and the UEF device 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UEF device 120 may also perform or direct, e.g., the execution of the corresponding/complementary processes for the techniques described herein and as illustrated in FIG. 10. The memories 442 and 482 may store data and program codes for the ANF device 110 and the UEF device 120, respectively. A scheduler 444 may schedule UEF devices for data transmission on the downlink and/or uplink.

Figure 5:
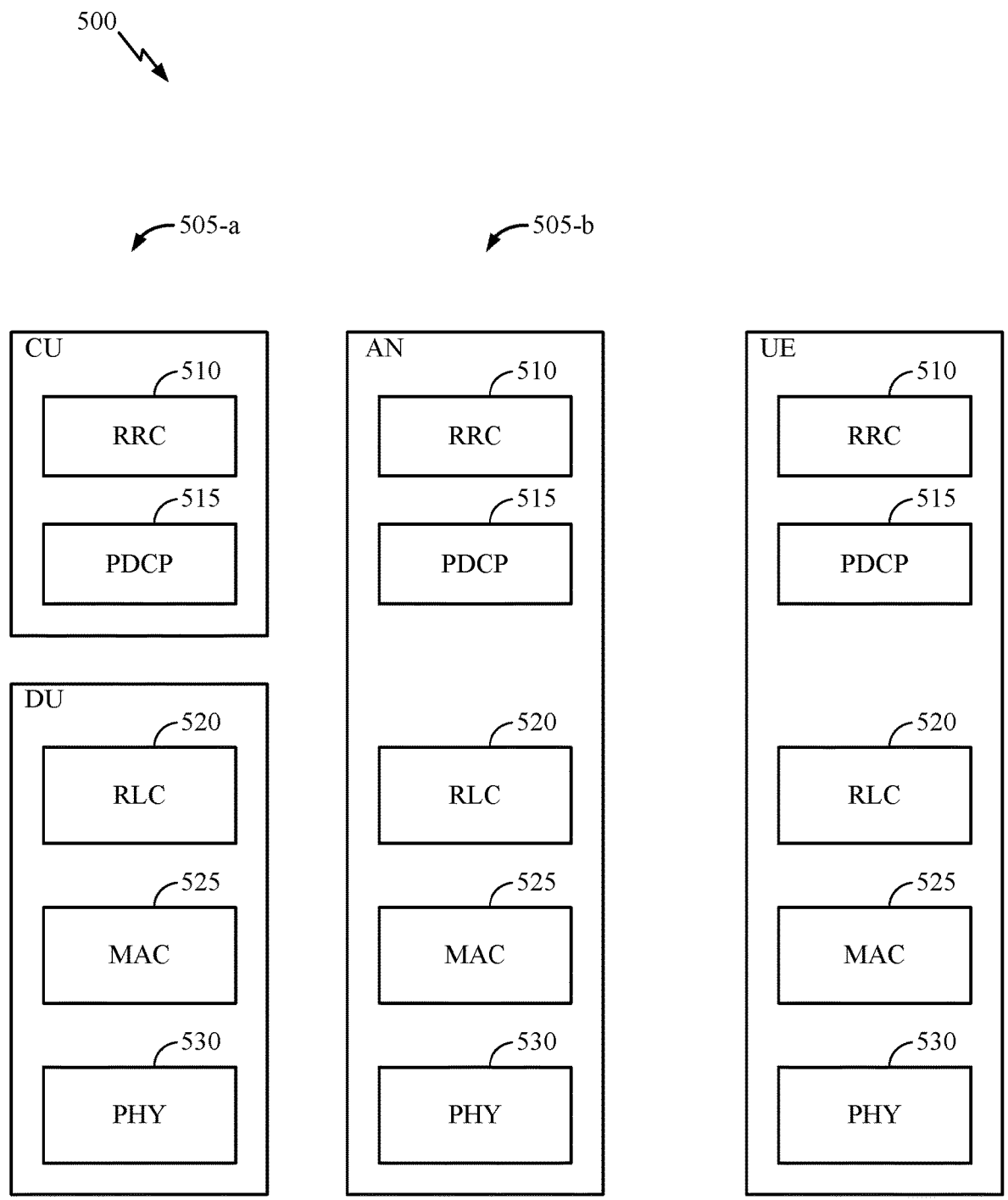
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UEF device.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR ANF device), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UEF device may implement an entire protocol stack (e.g., the RRC layer 510, the PDCP layer 515, the RLC layer 520, the MAC layer 525, and the PHY layer 530).

Figure 6:
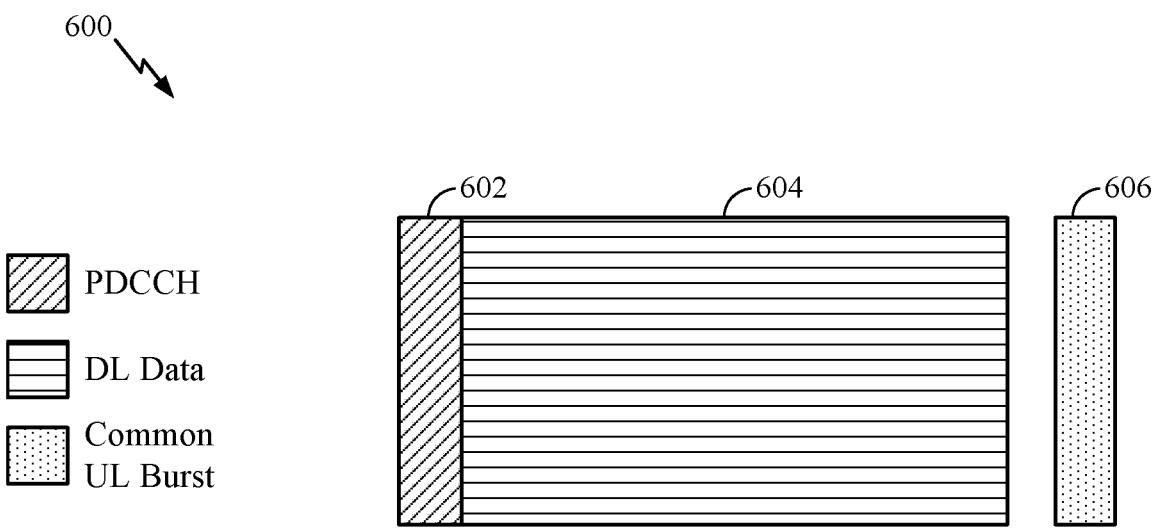
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UEF device or ANF device) to the subordinate entity (e.g., UEF device). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UEF device)) to UL communication (e.g., transmission by the subordinate entity (e.g., UEF device)). One of ordinary skill in the art will understand that the foregoing is merely one example of a DL-centric subframe and alternative structures having similar features may exist without necessarily deviating from the aspects described herein.

Figure 7:
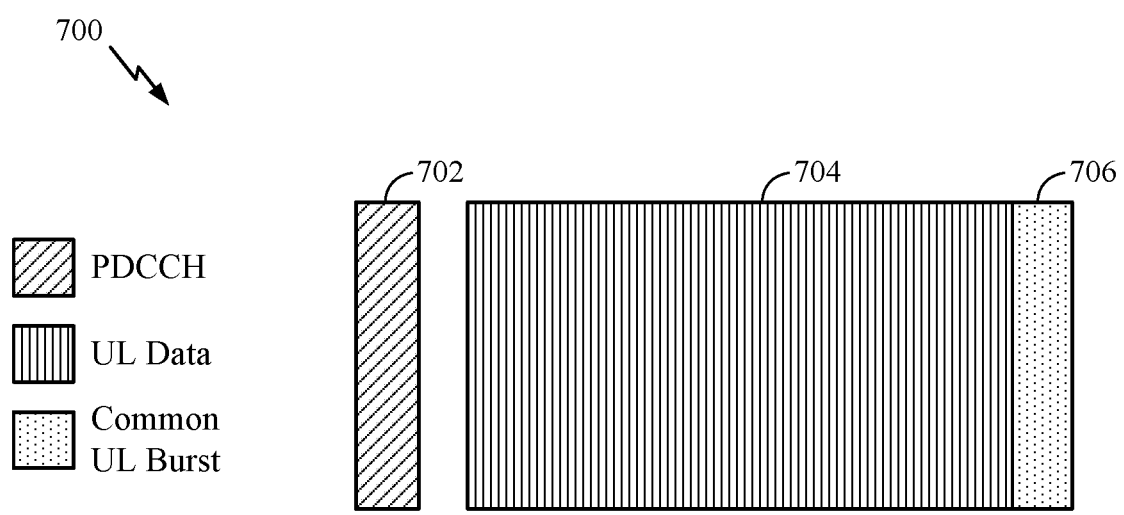
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UEF device) to the scheduling entity (e.g., UEF device or ANF device). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEF devices) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity to another subordinate entity without relaying that communication through the scheduling entity, even though the scheduling entity may be utilized for scheduling and/or control purposes. In some examples, the sidelink signals may be communicated using a licensed spectrum (unlike wireless local area networks, which typically use an unlicensed spectrum).

A UEF device may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UEF device may select a dedicated set of resources for transmitting a pilot signal to a network. When operating in the RRC common state, the UEF device may select a common set of resources for transmitting a pilot signal to the network. In either case, a pilot signal transmitted by the UEF device may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEF devices for which the network access device is a member of a monitoring set of network access devices for the UEF device. One or more of the receiving network access devices, or a CU to which receiving network access device(s) transmit the measurements of the pilot signals, may use the measurements to identify serving cells for the UEF devices, or to initiate a change of serving cell for one or more of the UEF devices.

Millimeter (mmWave) Systems

As used herein, the term mmWave generally refers to spectrum bands in very high frequencies such as 28 GHz.

Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked. Aspects of the present disclosure may take advantage of such directional beams, for example, by using the beams for RACH communication.

Figure 8:
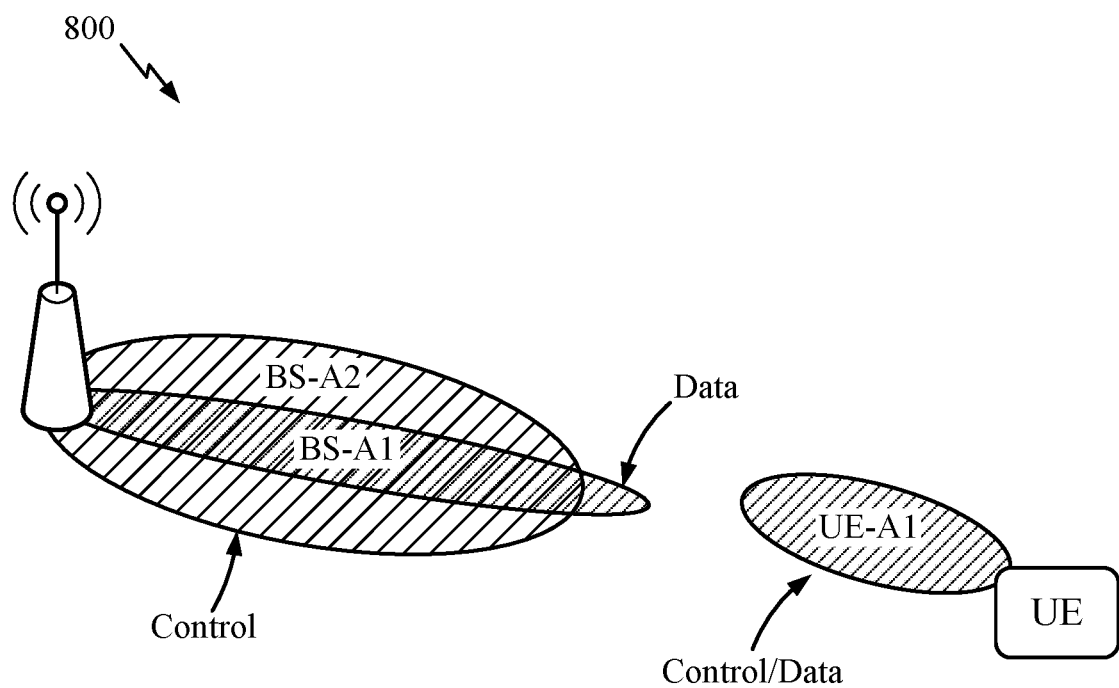
FIG. 8 illustrates an example of active beams, in accordance with certain aspects of the present disclosure.

FIG. 8 illustrates an example of active beams 800, in accordance with aspects of the present disclosure. An ANF device and a UEF device may communicate using a set of active beams. Active beams may refer to ANF device and UEF device beam pairs that are used to transmit data and control channels. A data beam may be used to transmit data and a control beam may be used to transmit control information. As illustrated in FIG. 8, data beam BS-A1 may be used to transmit DL data and control beam BS-A2 may be used to transmit DL control information.

An ANF device may monitor beams using beam measurements and feedback from a UEF device. For example, a BS may monitor active beams using DL reference signals. An ANF device may transmit a DL RS, such as a measurement reference signal (MRS), channel state information reference signal (CSI-RS), or a synchronization (synch) signal. A UEF device may report, to the ANF device, a reference signal receive power (RSRP) associated with a received reference signal. In this manner, the ANF device may monitor active beams.

Example Random Access Channel (RACH) Procedure

A random-access channel (RACH) is a channel that may be shared by multiple UEF devices and may be used by the UEF devices to access the network for communications. For example, the RACH may be used for call setup and to access the network for data transmissions. In some cases, RACH may be used for initial access to a network when the UEF device switches from a radio resource control (RRC) connected idle mode to active mode, or when handing over in RRC connected mode. Moreover, RACH may be used for downlink (DL) and/or uplink (UL) data arrival when the UEF device is in RRC idle or RRC inactive modes, and when reestablishing a connection with the network. Certain aspects of the present disclosure provide multiple RACH procedures and techniques for selecting a RACH procedure for communication.

Figure 9:
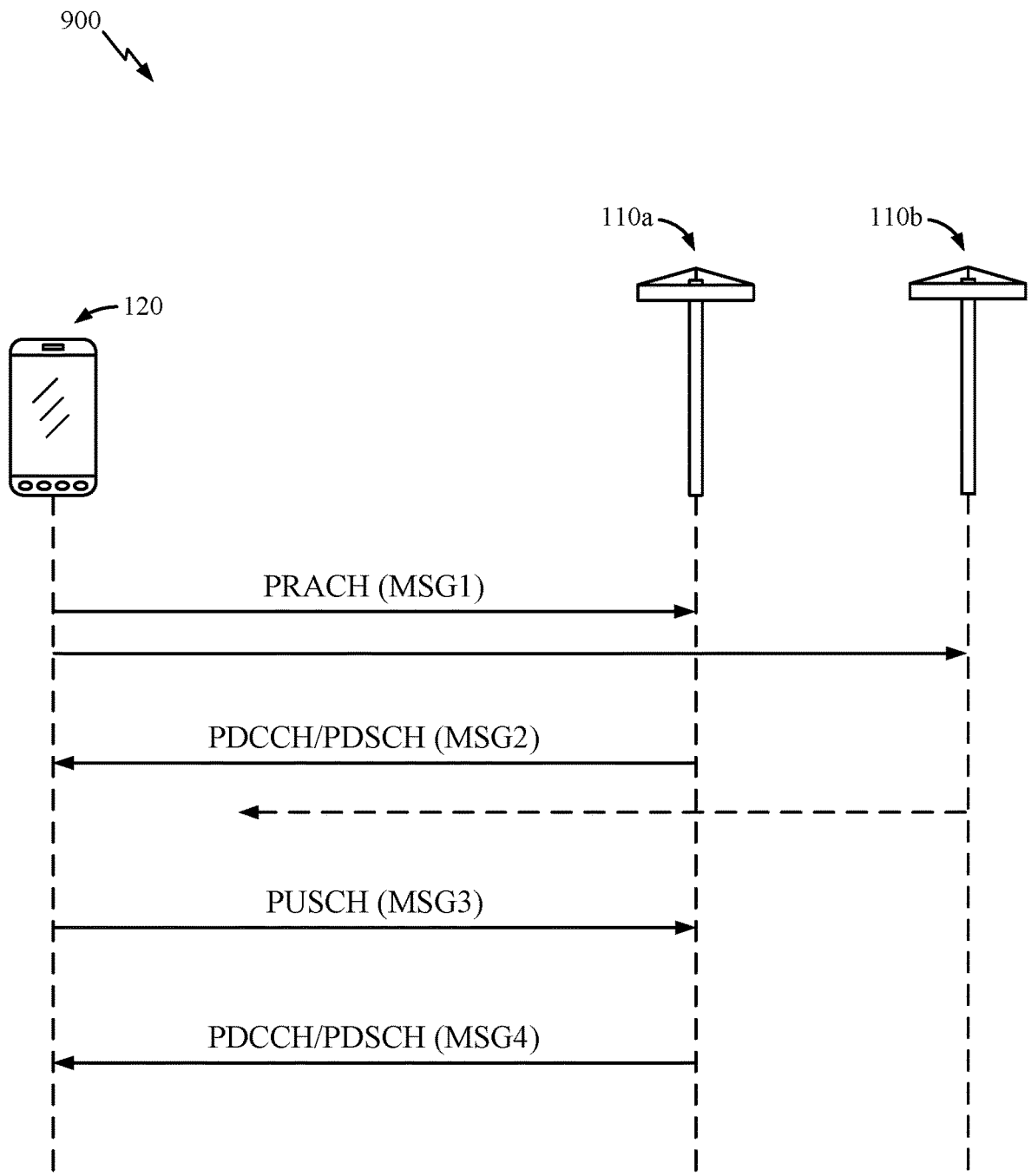
FIG. 9 a timing diagram illustrating an example four-step random-access channel (RACH) procedure, in accordance with certain aspects of the present disclosure.
Figure 10:
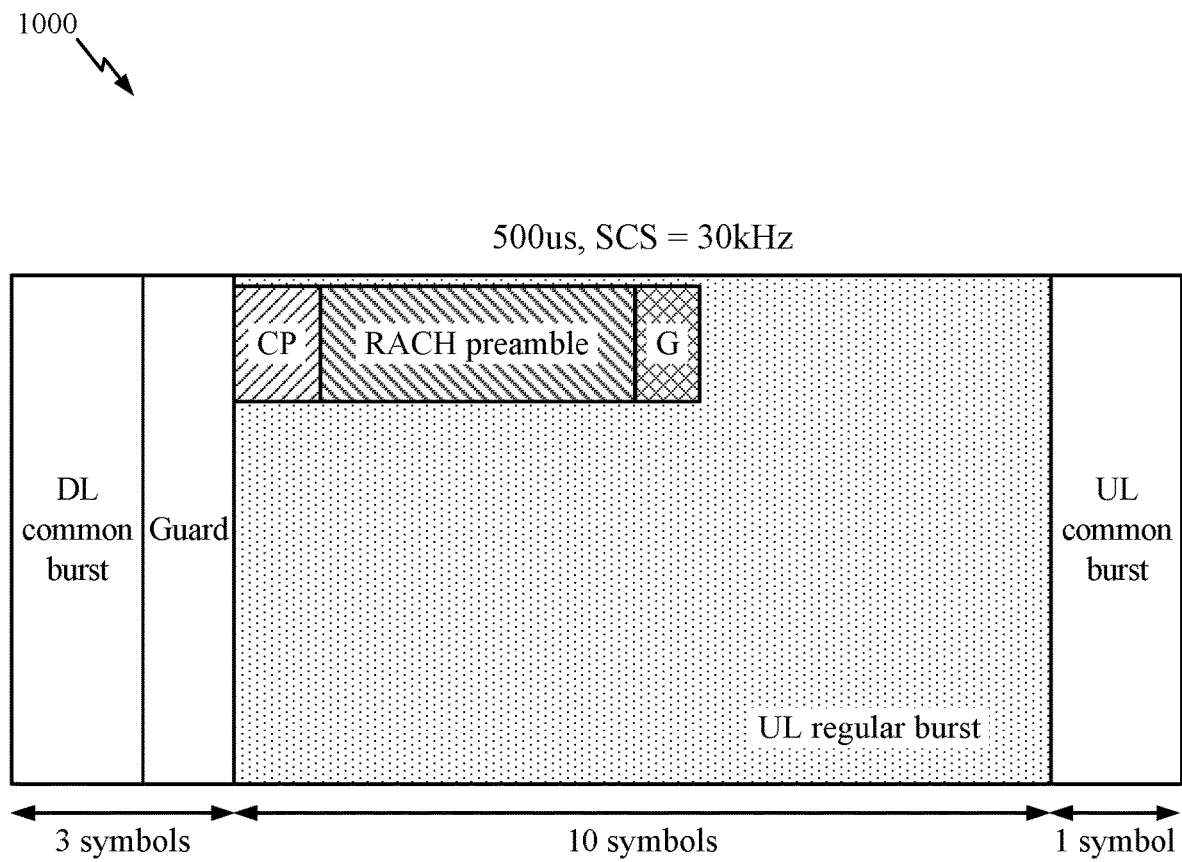
FIG. 10 is a diagram of an example uplink communication of a four-step RACH procedure, in accordance with certain aspects of the present disclosure.

FIG. 9 is a timing diagram 900 illustrating an example four-step RACH procedure, in accordance with certain aspects of the present disclosure. A first message (MSG1) may be sent from the UEF device 120 to ANF device 110a and ANF device 110b on the physical random access channel (PRACH). In this case, MSG1 may only include a RACH preamble. At least one of ANF device 110a or ANF device 110b may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UEF device 120 to ANF device 110a on the PUSCH. MSG2 may include a RRC connection request, a tracking area update, and a scheduling request. The ANF device 110a then responds with MSG 4 which may include a contention resolution message.

FIG. 10 is a diagram of an example uplink communication 1000 of MSG1 for a four-step RACH procedure, in accordance with certain aspects of the present disclosure. The uplink communication 1000 begins with a DL common burst, and ends with an UL common burst, as illustrated. The PRACH is included as part of the regulator UL burst between the DL and UL common bursts and includes a cyclic prefix (CP).

Figure 11:
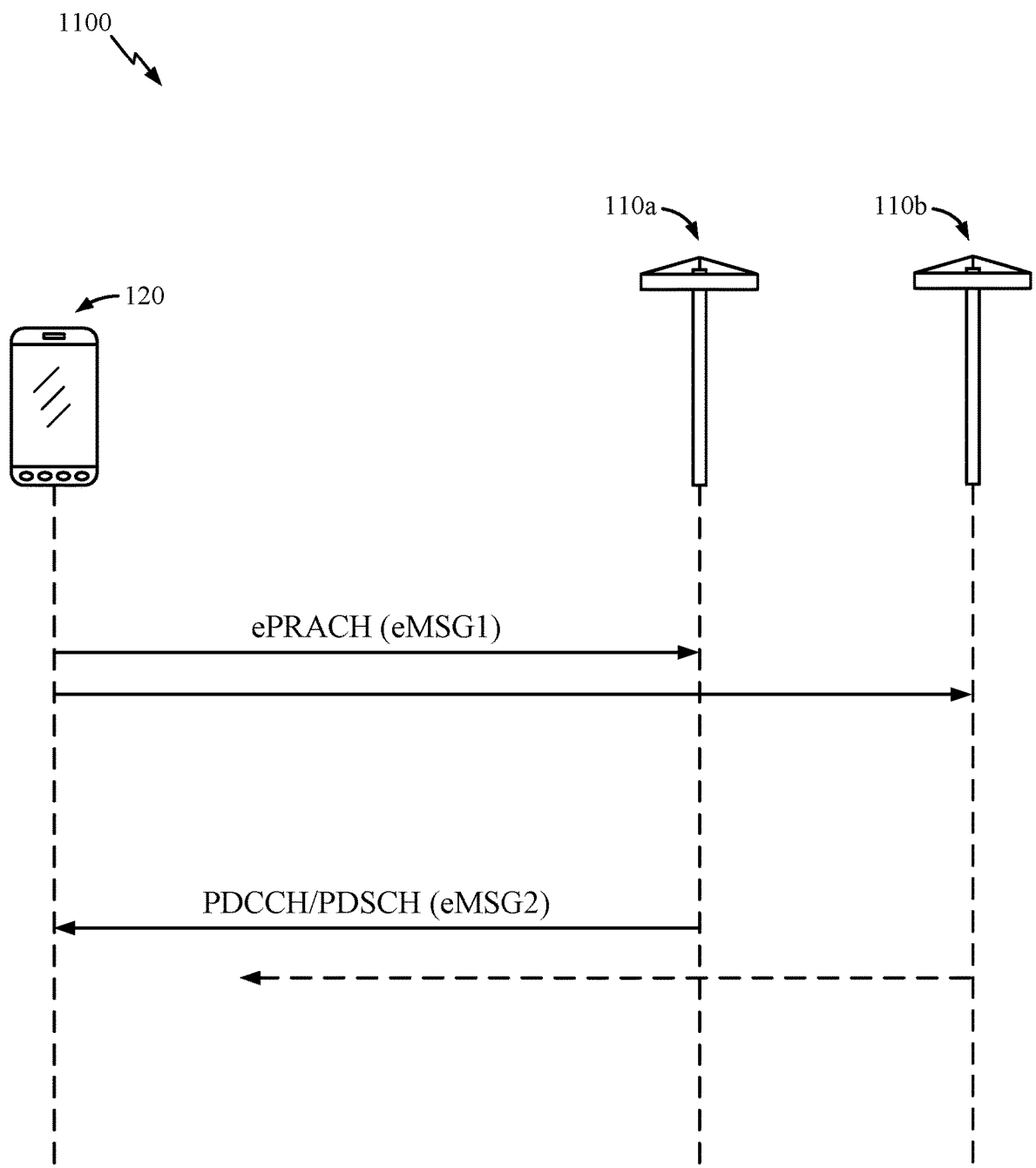
FIG. 11 is a timing diagram illustrating an example two-step RACH procedure, in accordance with certain aspects of the present disclosure.

FIG. 11 is a timing diagram 1100 illustrating an example two-step RACH procedure, in accordance with certain aspects of the present disclosure. A first enhanced message (eMSG1) may be sent from the UEF device 120 to ANF device 110a and ANF device 110b on an enhanced physical random access channel (ePRACH). In this case, eMSG1 may include a RACH preamble for random access and demodulation reference signal (RS) for RACH payload demodulation. eMSG1 may also include a RACH message containing the UE-ID and other signaling information (e.g., buffer status report (BSR)) or scheduling request (SR). At least one ANF device 110a or ANF device 110b may respond with a random access response (RAR) message (eMSG2) which may include the ID of the RACH preamble, a timing advance (TA), a back off indicator, a contention resolution messages, UL/DL grant, and a transmit power control (TPC) commands.

In certain aspects, eMSG 1 retransmission may be handled as re-attempts with transmit power ramping and with random timing to avoid collision. eMSG 2 retransmission may be implemented with a mapping between UE-ID in eMSG 1 to a UE-specific RNTI. The UEF device may monitor a common search space with UE-specific RNTI for retransmission of eMSG 2. In some cases, a mapping of RA resources (shift, sequence, SF/slot, etc.) into a RNTI may be implemented, so that UEF device can monitor PDCCH to allow eMSG 2 combining. In some cases, the timeline for eMSG 1 and eMSG 2 of the two-step RACH procedure may be similar to the timeline of MSG1 and MSG2 of the four-step RACH procedure.

Figure 12:
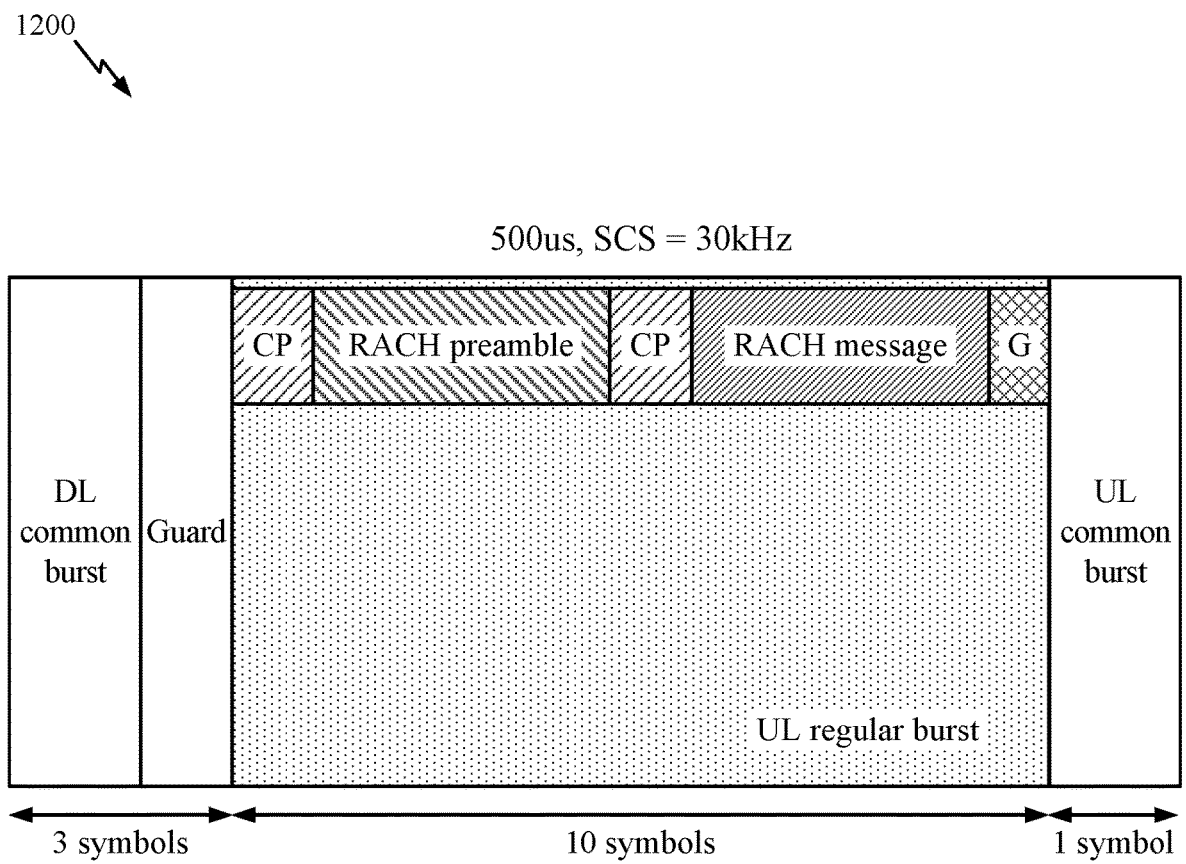
FIG. 12 is a diagram of an example uplink communication of a two-step RACH procedure, in accordance with certain aspects of the present disclosure.

FIG. 12 is a diagram of an example uplink communication 1200 of eMSG1 for a two-step RACH procedure, in accordance with certain aspects of the present disclosure. The uplink communication 1200 begins with a DL common burst, and ends with an UL common burst, as illustrated. The ePRACH is included as part of the regulator UL burst between the DL and UL common bursts, as illustrated. In this case, the ePRACH includes both a RACH preamble and a RACH message (payload), each including a cyclic prefix (CP).

In certain aspects of the present disclosure, the four-step RACH procedure may be used when UEF device transitions from an RRC-Idle mode of operation to an RRC-connected active mode of operations. The two-step RACH procedure may be used when the UEF device is in handover (HO) in RRC-connected active mode or when the UE transitions from RRC-connected inactive mode to RRC-connected active mode. The modes of operation of the UEF device are described in more detail with respect to FIG. 13.

Figure 13:
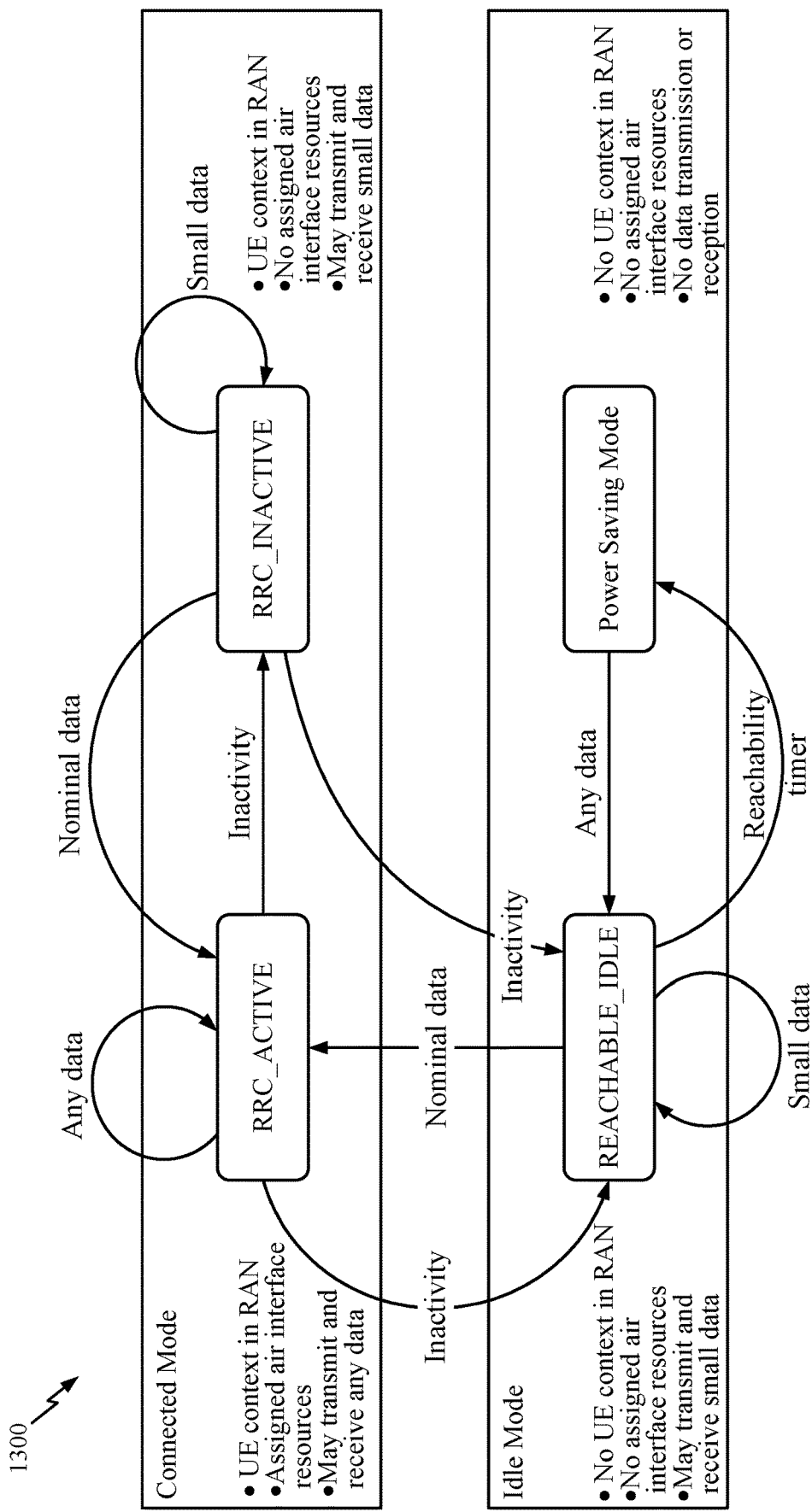
FIG. 13 is an example diagram illustrating different modes of operations of a UEF device, in accordance with certain aspects of the present disclosure.

FIG. 13 is an example diagram 1300 illustrating different modes of operations of a UEF device, in accordance with certain aspects of the present disclosure. As illustrated, a UEF device may be in either an RRC connected mode of operations or an idle mode of operation. In the RRC connected mode of operation, the UEF device may be either active (RRC_ACTIVE mode) or inactive (RRC_INACTIVE mode). In both the RRC_INACTIVE mode and the RRC_ACTIVE mode, there may be a UEF device context in the radio access network (RAN). In the RRC_INACTIVE mode, there may be no air interface resources assigned to the UE and the UEF device may be able to transmit and receive a small amount of data.

To transmit nominal data, the UEF device may switch to the RRC_ACTIVE mode in which there may be assigned air interface resources to the UEF device and the UEF device may be able to transmit and receive any data. Due to inactivity, the UEF device may enter the idle mode of operation, in which there may be a REACHABLE_IDLE mode and a power saving mode. In both the REACHABLE_IDLE mode and power saving mode, there may be no UEF device context in the RAN and no assigned air interface resources for the UE. In the REACHABLE_IDLE mode, the UEF device may be able to transmit and receive a small amount of data. In some cases, after a reachability timer has expired, the UE may enter the power saving mode, where the UEF device may be unable to transmit and receive data.

The UEF device modes of operation described herein may be implemented for new radio (NR). NR may refer to radios configured to operate according to a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive machine type communication (mMTC) targeting non-backward compatible MTC techniques, and mission critical targeting ultra-reliable low latency communications (URLLC). An NR cell may refer to a cell operating according to the NR network. A NR eNB (e.g., ANF device 110) may correspond to one or multiple transmission reception points (TRPs).

Example RACH Procedure in mmWave (mmW)

Certain aspects of the present disclosure are generally directed to the selection of a RACH procedure and one or more beams for communicating RACH messages. Different beams may be transmitted in different directions and may be received with different signal qualities. In certain aspects, a UEF device may select the beam with the highest signal quality for communication of RACH messages.

Figure 14:
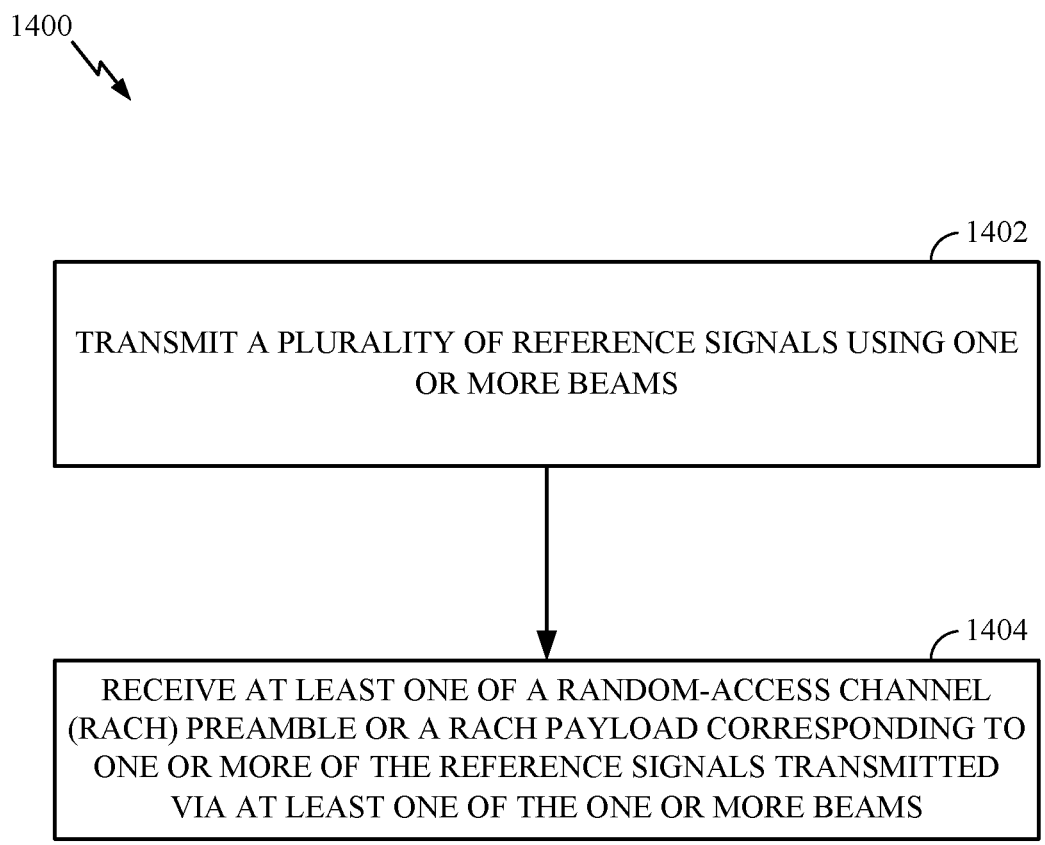
FIG. 14 illustrates example operations for wireless communication by an ANF device, in accordance with certain aspects of the present disclosure.

FIG. 14 illustrates example operations 1400 for wireless communication, in accordance with certain aspects of the present disclosure. In certain aspects, the operations 1400 may be performed by a ANF device such as the ANF device 110a.

The operations 1400 may begin, at block 1402, by transmitting a plurality of reference signals (e.g., synchronization signals) using one or more beams. In certain aspects, each of the one or more beams may be transmitted in a different direction. At block 1404, the ANF device may receive at least one of a random-access channel (RACH) preamble or a RACH payload corresponding to one or more of the reference signals transmitted via at least one of the one or more beams.

Figure 15:
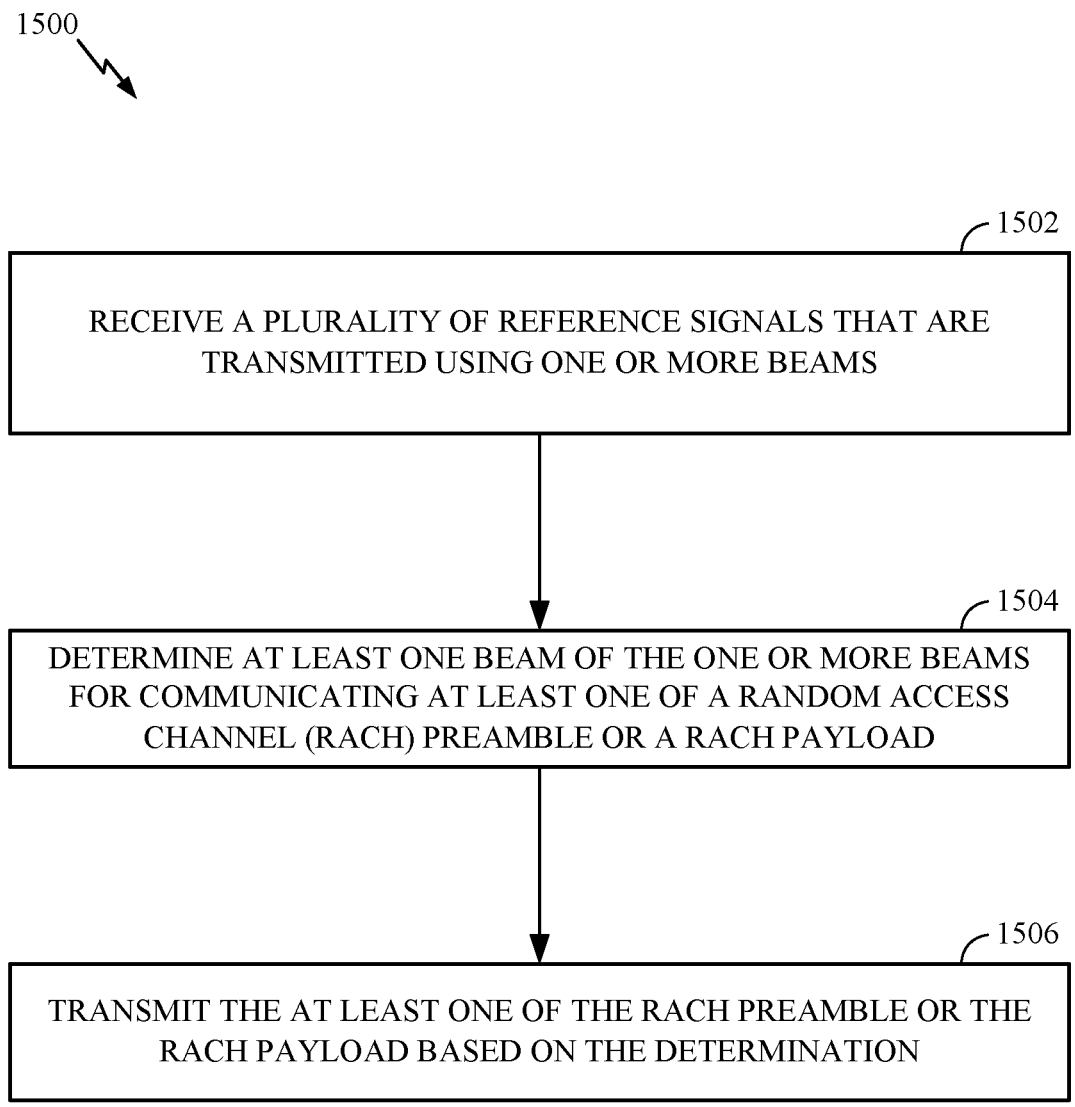
FIG. 15 illustrates example operations for wireless communication by a UEF device, in accordance with certain aspects of the present disclosure.

FIG. 15 illustrates example operations 1500 for wireless communication, in accordance with certain aspects of the present disclosure. In certain aspects, the operations 1500 may be performed by a UEF device such as the UEF device 120.

The operations 1500 may begin, at block 1502, by receiving a plurality of reference signals that are transmitted using one or more beams. In certain aspects, each of the one or more beams may be transmitted in a different direction. At block 1504, the UEF device may determine at least one beam of the one or more beams for communicating at least one of a RACH preamble or a RACH payload, and at block 1506, transmit the at least one of the RACH preamble or the RACH payload based on the determination.

In certain aspects, the reference signals may be at least one of synchronization signals, channel state information reference signals or mobility reference signals. The synchronization signals may be at least one of a primary synchronization signal (PSS), a secondary synchronization signal (SSS), a physical broadcast channel (PBCH) signal or demodulation reference signal (DMRS) of the PBCH signal.

Figure 19:
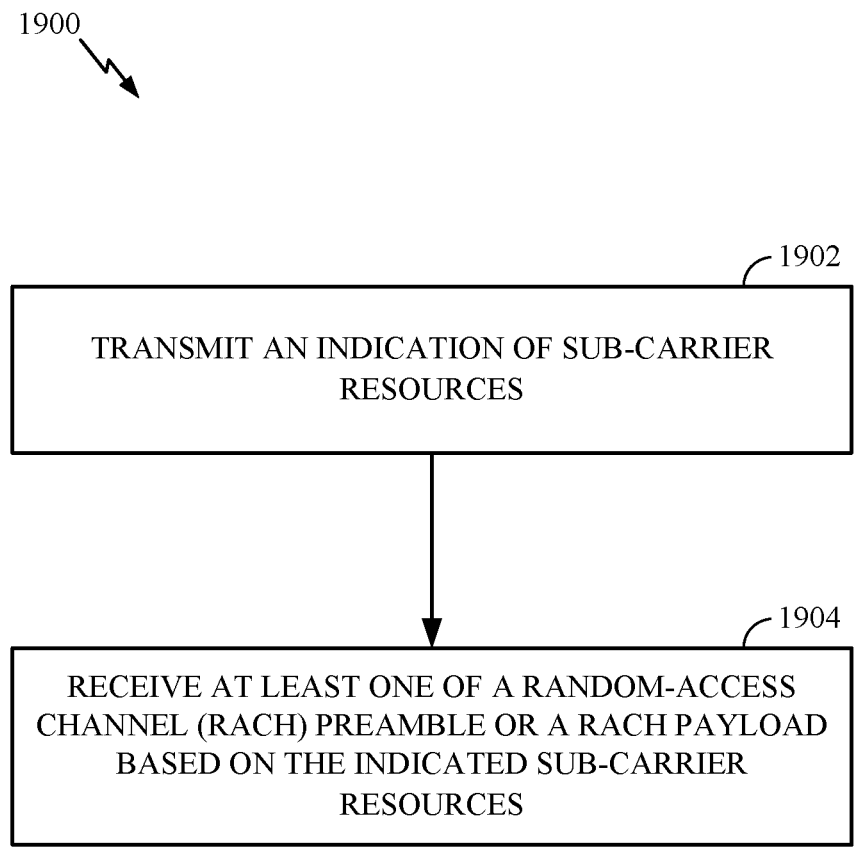
FIG. 19 illustrates example operations for indicating sub-carrier resources for wireless communication, in accordance with certain aspects of the present disclosure.
Figure 20:
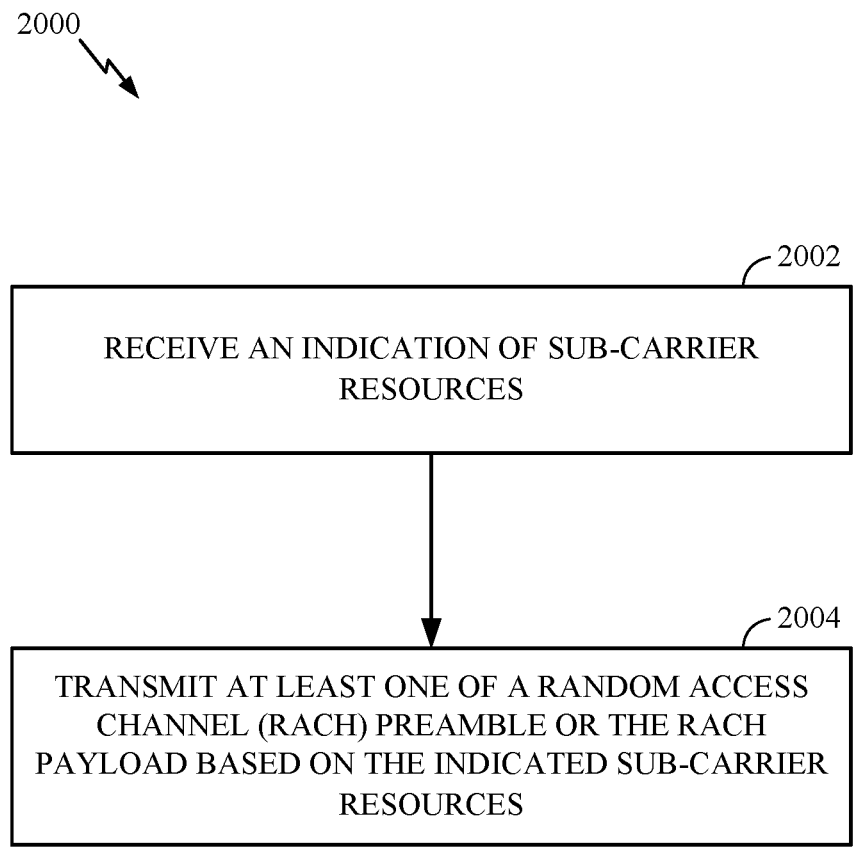
FIG. 20 illustrates example operations for receiving an indication of sub-carrier resources for wireless communication, in accordance with certain aspects of the present disclosure.

As described in more detail with respect to FIGS. 19 and 20, the ANF device may transmit an indication of sub-carrier resources to the UEF. In this case, the at least one of the RACH preamble or the RACH payload is transmitted, at block 1506 of FIG. 15, by the UEF via the indicated sub-carrier resources, and received by the ANF, at block 1404 of FIG. 14, via the indicated sub-carrier resources.

Figure 16:
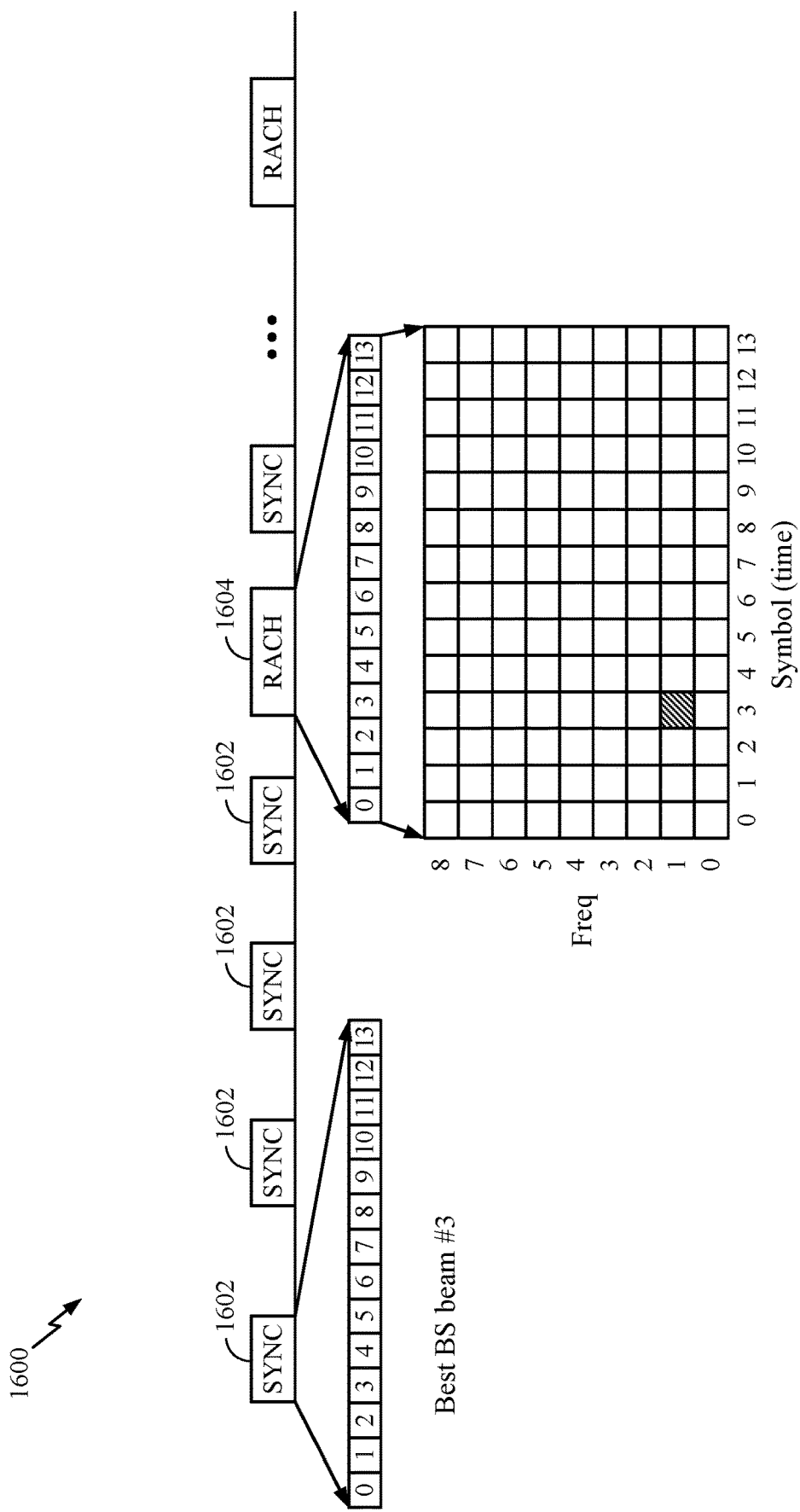
FIG. 16 is a diagram illustrating example synchronization (SYNC) and RACH message communication, in accordance with certain aspects of the present disclosure.

FIG. 16 illustrates an example reference signal (e.g., synchronization (SYNC) signal) and RACH message communication protocol 1600, in accordance with certain aspects of the present disclosure. For example, an ANF device (e.g., ANF device 110) may transmit one or more SYNC messages 1602 to a UE (e.g., UE 120) in order to synchronize communications. Each SYNC message may include multiple symbols (e.g., 13 symbols), and each of the symbols may be transmitted using a different beam (e.g., in different directions).

The UEF device may receive the SYNC message and determine the beam (e.g., symbol) with the highest signal quality. As illustrated, the RACH message 1604 transmitted by the UEF device may also include multiple symbols which may correspond to the symbols of the SYNC message. The UEF device may determine which of the beams (e.g., symbol) of the SYNC message has the highest quality and use the beam (e.g., symbol) having the highest quality to transmit the RACH preamble (e.g., MSG 1 of the four-step RACH procedure). For example, if beam three (e.g., symbol three) of the SYNC message was selected to have the highest quality, beam three of the RACH message may be used to transmit the RACH preamble. In some cases, the UE may determine two highest quality beams (or symbols) of the SYNC message. The two highest quality beams may be used by the UEF device to transmit the RACH preamble and the RACH payload.

Figure 17:
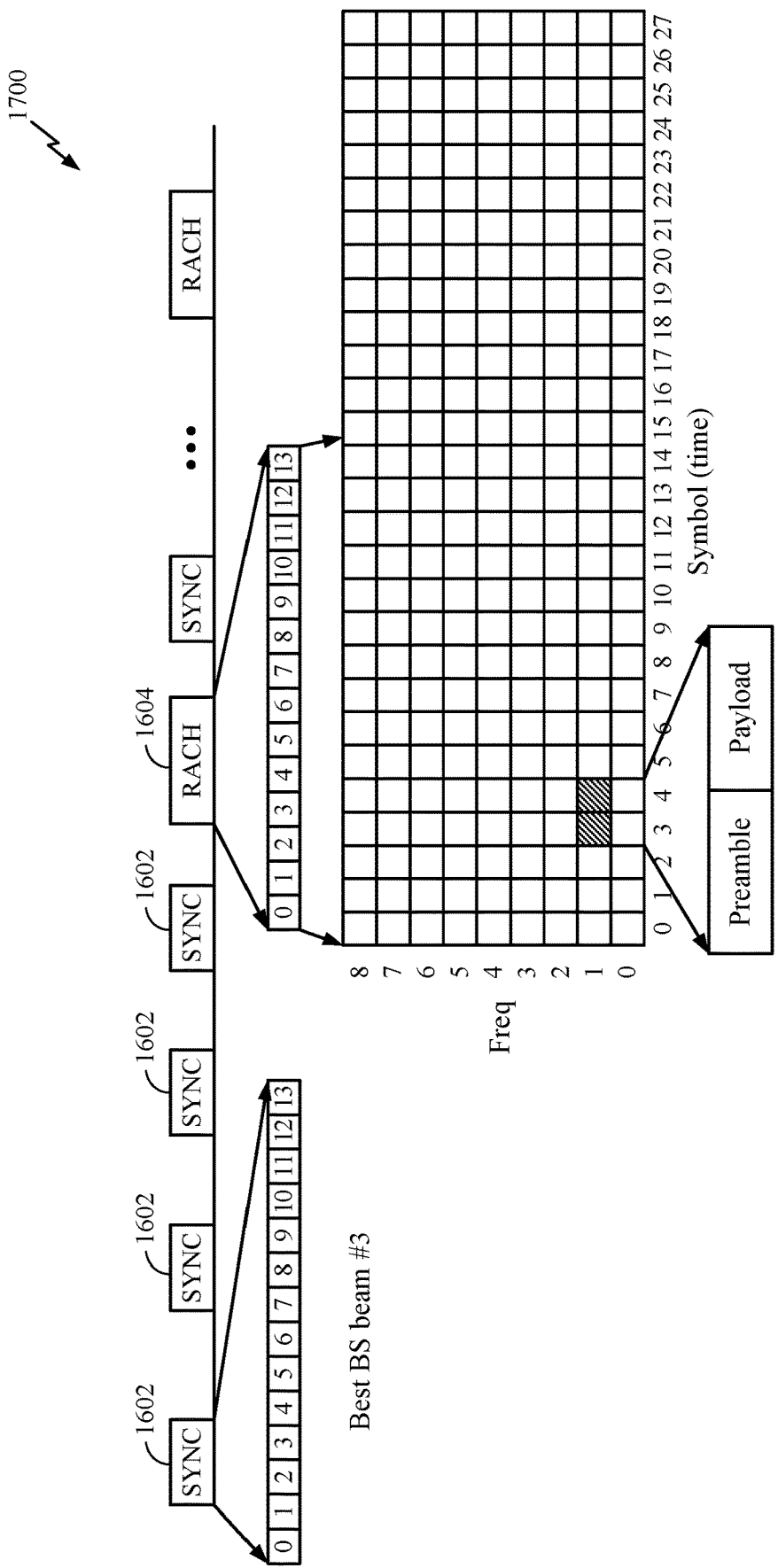
FIG. 17 is a diagram illustrating an example RACH message communication using time division multiplexing (TDM), in accordance with certain aspects of the present disclosure.

FIG. 17 is a diagram 1700 illustrating example SYNC messages 1602 and RACH message 1604 communication for the two-step RACH procedure, in accordance with certain aspects of the present disclosure. For the two-step RACH procedure, two symbols may be used to communicate the RACH preamble and the RACH payload (e.g., eMSG1). Thus, the symbols of the SYNC message may be grouped into groups of two symbols, each group transmitted using a different beam.

The UEF device may determine the symbol group having the highest quality, and transmit the RACH preamble and the RACH payload using the beam corresponding to the selected symbol group. For example, the UEF device may determine that symbols three and four have the highest quality, and may send the RACH preamble in symbol three, and the RACH payload in symbol four, using the beam corresponding to symbols three and four of the SYNC message. In this case, the total time resource overhead increases since both of the symbols three and four are being used, as compared to a case where different sub-carrier resources are used to transmit the RACH preamble and the RACH payload. In some cases, the RACH preamble can act as the reference signal (RS) for the RACH payload and the RACH payload may be scrambled by the identifier of the RACH preamble (preamble ID) such that the ANF device can determine that the RACH payload has come from the same UE as the RACH preamble.

Figure 18:
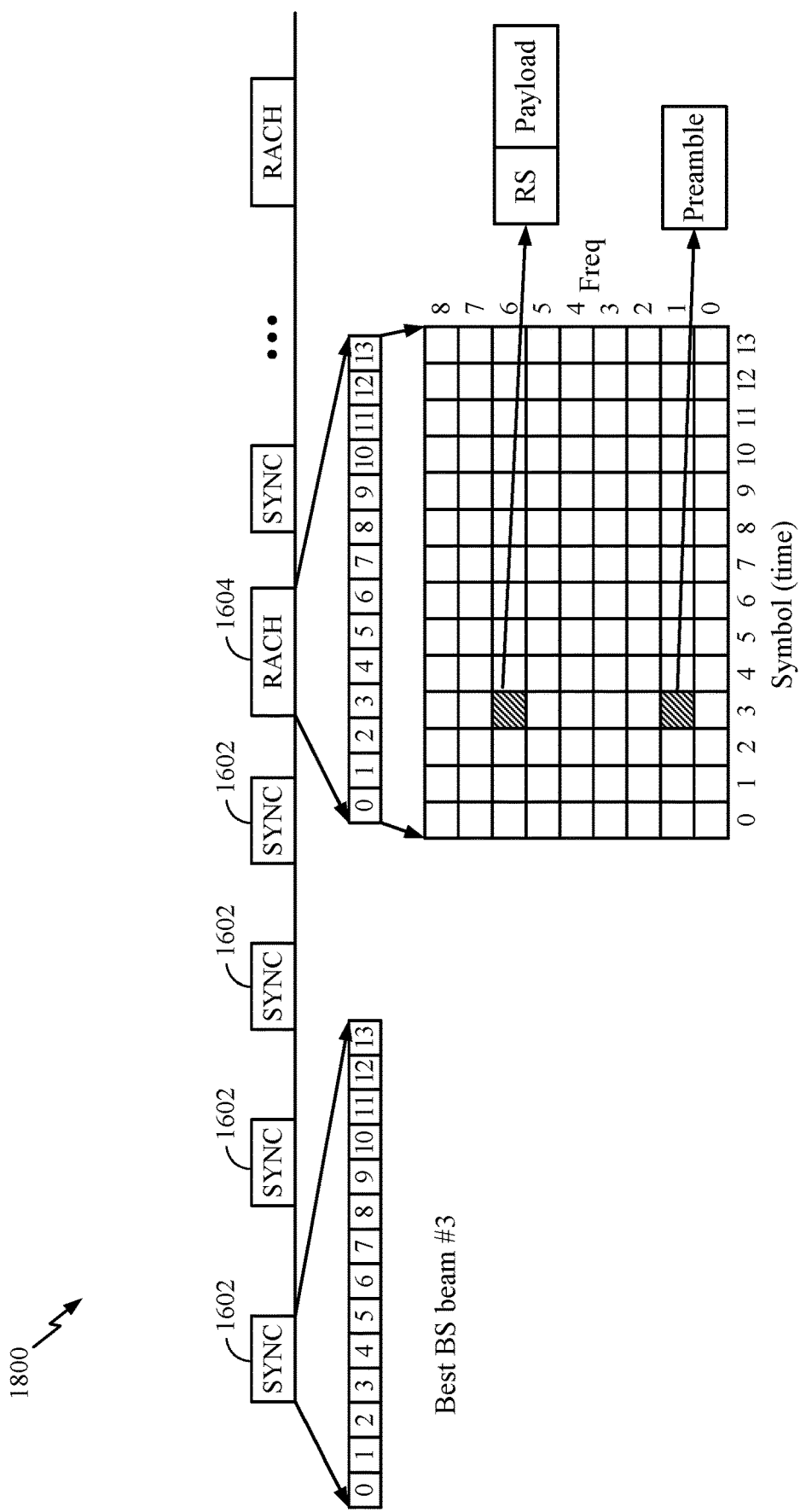
FIG. 18 is a diagram illustrating an example RACH message communication for a two-step RACH procedure using frequency division multiplexing (FDM), in accordance with certain aspects of the present disclosure.

FIG. 18 is a diagram 1800 illustrating example SYNC and RACH message communication for the two-step RACH procedure, in accordance with certain aspects of the present disclosure. In this case, the RACH preamble and the RACH payload may be transmitted using the same symbol, but different frequency resources (e.g., subcarrier resources). For example, if the UEF device determines that the beam corresponding to symbol three of the SYNC message has the highest quality, the UEF device may transmit both the RACH preamble and the RACH payload using symbol three (e.g., and the beam corresponding to symbol 3), but using different frequency resources.

In this case, the total frequency resource overhead may increase. However, frequency resources may be less scarce than time resources in multi-beam RACH subframes. Moreover, the UEF device may not be scheduled for PUSCH due to the short symbol duration. In certain aspects, separate reference signals (RSs) may be used for the RACH preamble and the RACH payload. Moreover, only UEF devices with a good link gain may be able to transmit the two-step RACH as the UEF device may have to split the transmit power between the RACH preamble the RACH payload. In some cases, the RACH payload may be scrambled by the RACH preamble ID such that the ANF device can determine that the RACH payload is from the same UEF device as the RACH preamble.

Certain aspects of the present disclosure are generally directed to techniques for communicating a RACH messages using different frequency resources. For example, the ANF device may indicate, to the UEF device, one or more sub-carrier resources to be used for transmission of the RACH preamble and/or RACH payload, as described in more detail with respect to FIGS. 19 and 20.

FIG. 19 illustrates example operations 1900 for wireless communication, in accordance with certain aspects of the present disclosure. In certain aspects, the operations 1900 may be performed by a UEF device.

The operation 1900 may begin, at block 1902, by transmitting an indication of sub-carrier resources to a UEF device. At block 1904, the ANF device receives at least one of the RACH preamble or a RACH payload based on the indicated sub-carrier resources.

FIG. 20 illustrates example operations 2000 for wireless communication, in accordance with certain aspects of the present disclosure. In certain aspects, the operations 2000 may be performed by a UEF device.

The operation 2000 may begin, at block 2002, by receiving an indication of sub-carrier resources. At block 2004, the UEF device transmits at least one of a RACH preamble or a RACH payload based on the indicated sub-carrier resources.

In certain aspects, the total resources for the RACH preamble and the RACH payload may be fixed. In other words, an increase of the resources for the RACH preamble may be offset with an increase of the resources for the RACH payload, such the total resources assigned to the RACH preamble and the RACH payload does not change. In some cases, the indication of the sub-carrier resources includes an indication (e.g., a ratio) of the split between the RACH preamble and the RACH payload.

In certain aspects, the indication of the subcarrier resources may be communicated as part of at least one of a master information block (MIB), system information block (SIB), or minimum SIB message. Minimum SIB may denote the minimum SIB information for conveying a RACH configuration. In some cases, the MIB, SIB, or minimum SIB messages may be communicated via at least one broadcast channel (e.g., physical broadcast channel (PBCH) or extended PBCH). In certain aspects, a beam may be selected based on a SYNC message as described herein, and the RACH preamble and/or RACH payload may be communicated using the sub-carrier resources and via the selected beam.

Figure 21:
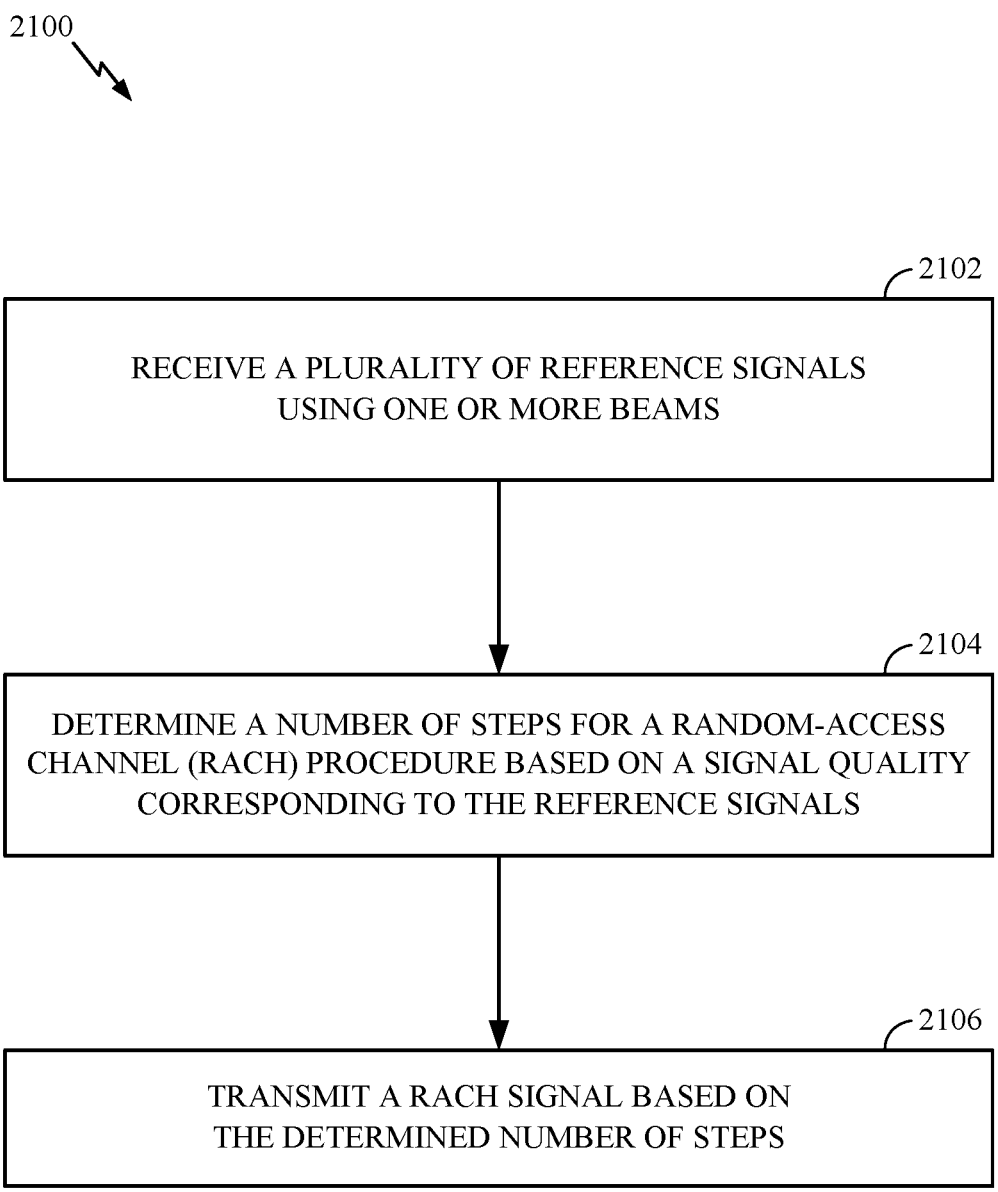
FIG. 21 illustrates example operations for determining a RACH procedure, in accordance with certain aspects of the present disclosure.

FIG. 21 illustrates example operations 2100 for wireless communication, in accordance with certain aspects of the present disclosure. In certain aspects, the operations 2100 may be performed by a UEF device.

The operations 2100 may begin, at block 2102, by receiving a plurality of reference signals (e.g., SYNC signals) using one or more beams. At block 2104, the UEF device may determine a number of steps for a random-access channel (RACH) procedure based on a signal quality corresponding to the reference signals, and at block 2106, transmit a RACH signal (e.g., the RACH preamble and/or RACH payload described herein) based on the determined number of steps.

The UEF device may be able to support both the four-step and the two-step RACH procedures described with respect to FIGS. 9 and 11 and may determine which RACH procedure to use based on the number of beams (or symbols) that are considered to have an acceptable quality. For example, a quality parameter of the beams may be compared to a threshold and considered to have an acceptable quality if the quality parameter is above the threshold (or below the threshold depending on the quality parameter being used). For example, if two symbols are determined by the UE to have a signal quality above the threshold, the UEF device may determine to use the two-step RACH procedure and send the RACH preamble in the first symbol and the RACH payload in the second symbol. Otherwise, if the UEF device determines that only a single symbol has a signal quality that is above the threshold, the UEF device may determine to use the four-step RACH procedure and just send the RACH preamble in the determined symbol. In some cases, if the UEF device determines that only a single symbol has a signal quality that is above the threshold, the UEF device may determine to use the two-step RACH procedure and use different frequency resources for the RACH preamble and the RACH payload.

Figure 22:
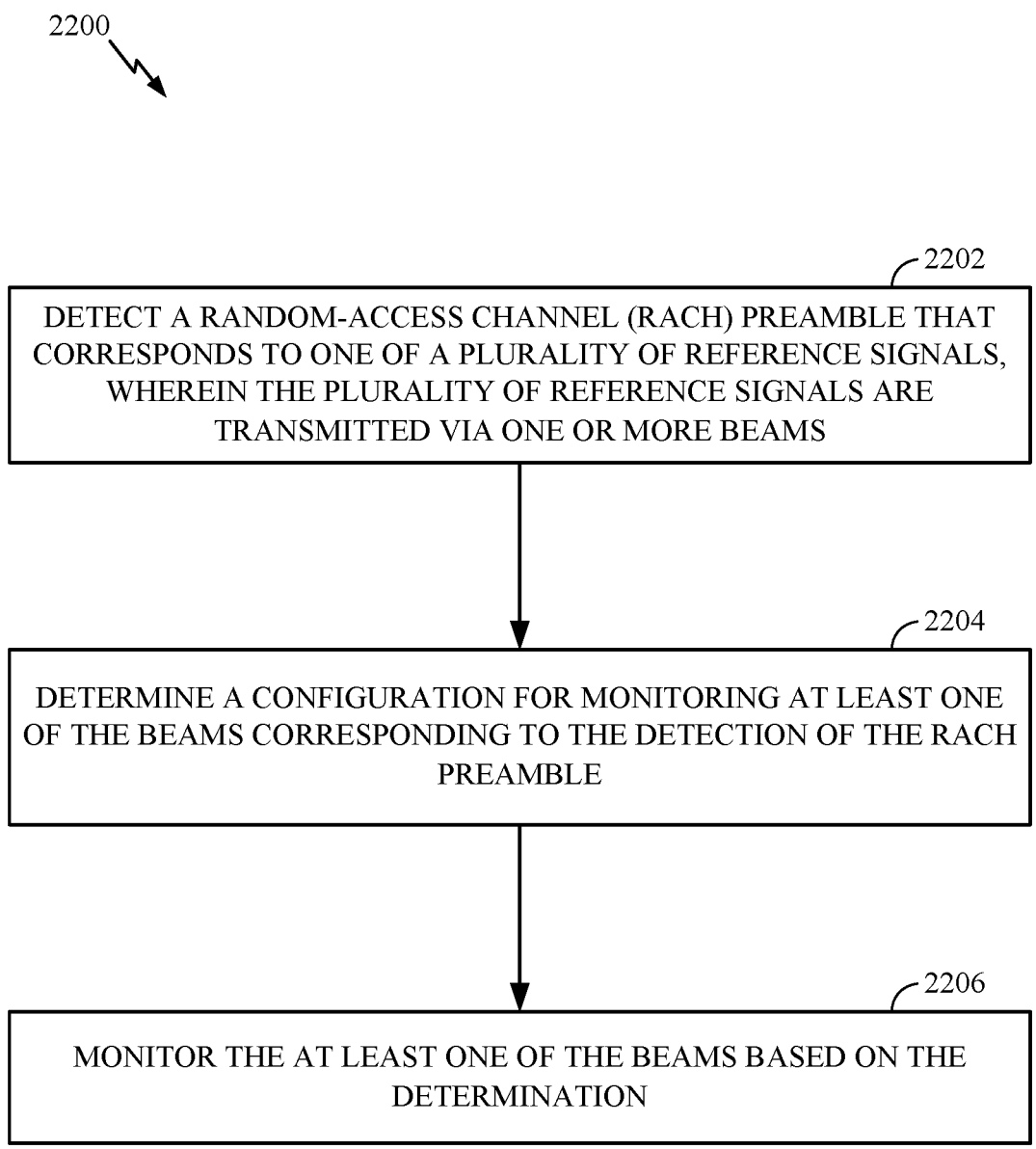
FIG. 22 illustrates example operations for monitoring for a RACH message, in accordance with certain aspects of the present disclosure.

FIG. 22 illustrates example operations 2200 for wireless communication, in accordance with certain aspects of the present disclosure. In certain aspects, the operations 2200 may be performed by an ANF device.

The operations 2200 may begin, at block 2202, by detect a random-access channel (RACH) preamble that corresponds to one of a plurality of reference signals, wherein the plurality of reference signals are transmitted via one or more beams. At block 2204, the UEF device may determine a configuration for monitoring at least one of the beams corresponding to the detection of the RACH preamble, and at block 2206, monitor the at least one of the beams based on the determination. For example, determining the configuration may include determining a duration for monitoring the beam on which the RACH signal was detected, as described in more detail with respect to FIG. 23.

Figure 23:
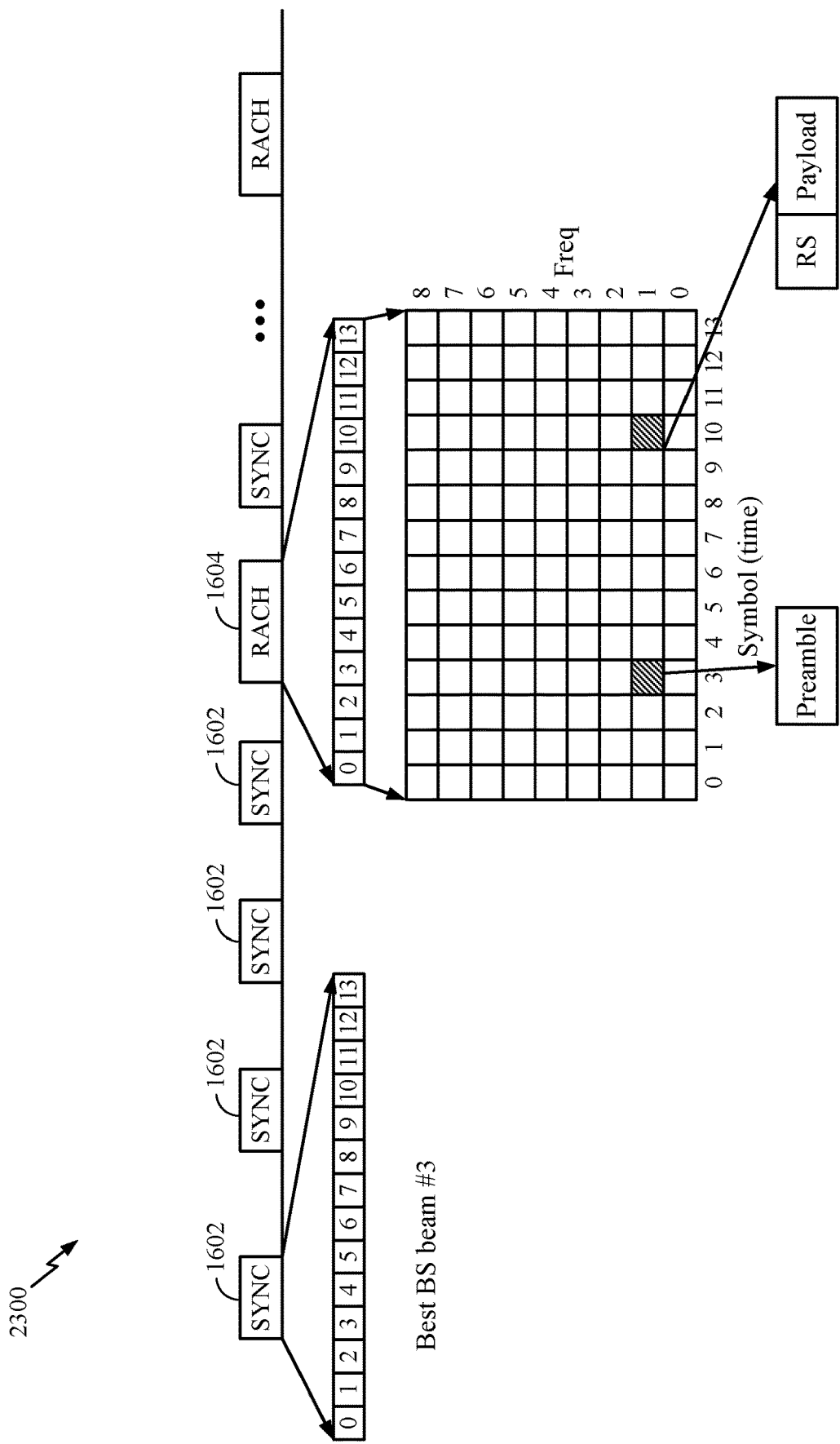
FIG. 23 is a diagram illustrating an example protocol for monitoring for a RACH message, in accordance with certain aspects of the present disclosure.

FIG. 23 is a diagram 2300 illustrating example reference signal (synchronization (SYNC) signal) and RACH message communication for the two-step RACH procedure, in accordance with certain aspects of the present disclosure. The ANF device monitors for the RACH preamble in one direction (e.g., beam) and if the preamble is detected, the ANF device continues to monitor that direction (or beam) to receive the RACH payload. Otherwise, the ANF device may move on to the next beam or direction. For example, the ANF device may be configured to monitor beams 0-6 in symbols 0-6.

In symbol 7+s (e.g., symbol 10 where s=symbol 3), the ANF device may monitor beam 7+s if the RACH preamble was not detected in symbol s. However, if the RACH preamble was detected in symbol s, the ANF device may monitor beam s (same beam (direction) as symbol s in symbol 7+s to decode the RACH payload. In some cases, the RACH preamble and the RACH payload of different beams may partially overlap. In certain aspects, the time for the ANF device that may otherwise be spent monitoring all the different possible beam directions may be reduced and the BS may be allowed to monitor both good/bad link budget UEF devices.

In certain aspects, separate RACH subframes may be used for MSG1 (e.g., RACH preamble only) and eMSG1 (e.g., RACH preamble and RACH payload). Each of the RACH subframes can be optimized to the particular transmission. In particular, the eMSG1 subframe could have a longer duration and different periodicity than a subframe that may be used for MSG1 with only a RACH preamble. This may involve extra overhead of two types of reserved RACH subframes.

Alternatively, eMSG1 can be sent in two parts, on two separate beams. The first part may be similar to MSG1, while the second part may be similar to MSG3. Moreover, the first part could carry information about the second part (e.g., its frequency assignment). In certain aspects, the second part could include a RS and data transmission. In this case, the UEF device may use two detected beams (e.g., of the SYNC message). However, if only one strong beam is detected, the UEF device could switch to the four-step RACH procedure. The RS may be included in both the parts used for the RACH preamble and the RACH payload and may be related by a one-to-one mapping to allow the ANF device to identify and match the two parts.

While examples provided herein have described using SYNC signals to facilitate RACH communication, any reference signal may be used, such as channel state information reference signals or mobility reference signals. In some cases, SYNC signals may be at least one of PSS, SSS, PBCH signal or DMRS of the PBCH signal.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
 transmitting, to a wireless node, a plurality of reference signals using a plurality of beams;

transmitting an indication of sub-carrier resources for transmission of a random-access channel (RACH) preamble and a RACH payload; and receiving, from the wireless node, a RACH message comprising a RACH preamble and a RACH payload, the RACH message being transmitted via at least one of the plurality of beams, wherein the RACH message indicates that a receive signal quality parameter associated with the at least one of the plurality of beams corresponding to the one or more of the plurality of reference signals exceeds a threshold, wherein the RACH preamble and the RACH payload are received using the same beam, wherein the RACH preamble and the RACH payload are received in different time or frequency resources, and wherein the RACH preamble and the RACH payload are received based on the indicated sub-carrier resources.

2. The method of claim 1, wherein the reference signals comprise at least one of synchronization signals, channel state information reference signals, or mobility reference signals.

3. The method of claim 1, wherein each of the plurality of beams is transmitted towards a different direction.

4. The method of claim 1, further comprising:
transmitting a random access response, wherein the RACH payload is received before transmitting the random access response.

5. The method of claim 1, wherein the RACH payload comprises a UE identifier (ID).

6. The method of claim 1, wherein the RACH payload comprises at least one of a scheduling request, buffer status request, or a beam tracking request.

7. The method of claim 1, wherein the RACH payload is scrambled based on an identifier of the RACH preamble.

8. A method for wireless communications, comprising:
receiving, from a wireless node, a plurality of reference signals that are transmitted using a plurality of beams;
receiving an indication of sub-carrier resources for transmission of a random-access channel (RACH) preamble and a RACH payload;
determining at least one beam of the plurality of beams for transmitting a RACH message comprising a RACH preamble and a RACH payload, wherein the determination of the at least one beam is based on a receive signal quality parameter associated with one or more of the plurality of reference signals received using the at least one beam of the plurality of beams exceeding a threshold; and
transmitting, to the wireless node, the RACH message comprising the RACH preamble and the RACH payload via the at least one beam, wherein the RACH preamble and the RACH payload are transmitted using the same beam, wherein the RACH preamble and the RACH payload are transmitted in different time or frequency resources, and wherein the RACH preamble and the RACH payload are transmitted based on the indicated sub-carrier resources.

9. The method of claim 8, further comprising:
receiving a random access response, wherein the RACH payload is transmitted before receiving the random access response.

10. The method of claim 8, wherein the RACH payload is scrambled based on an identifier of the RACH preamble.

11. The method of claim 8, wherein the RACH payload comprises a UE identifier (ID).

12. The method of claim 8, further comprising:
determining a number of steps for a RACH procedure based on the receive signal quality parameter corresponding to the at least one of the plurality of beams, wherein the RACH preamble and the RACH payload are transmitted based on the determined number of steps.

13. The method of claim 12, wherein:
the RACH procedure comprises a two-step RACH procedure if the receive signal quality parameter of at least two of the plurality of beams is determined to be acceptable by comparing the receive signal quality parameter to the threshold; and
the RACH preamble is transmitted via a first beam of the at least two beams and the RACH payload is transmitted via a second beam of the at least two beams.

14. The method of claim 12, wherein:
the RACH procedure comprises a two-step RACH procedure if the receive signal quality parameter of a single beam of the plurality of beams is determined to be acceptable by comparing the receive signal quality parameter to the threshold; and
the RACH preamble and RACH payload are transmitted via the single beam having the acceptable signal quality and using different frequency resources.

15. The method of claim 8, wherein total resources for receiving the RACH preamble and the RACH payload is fixed.

16. The method of claim 15, wherein the indication comprises an indication of a resource split between the RACH preamble and the RACH payload.

17. The method of claim 8, wherein the indication received as part of at least one of a master information block (MIB), system information block (SIB), or minimum SIB message.

18. The method of claim 17, wherein the minimum SIB comprises minimum SIB information for conveying a RACH configuration.

19. An apparatus for wireless communications, comprising:
a memory; and
one or more processors coupled to the memory, the one or more processors being configured to:
receive, from a wireless node, a plurality of reference signals that are transmitted using a plurality of beams;
receive an indication of sub-carrier resources for transmission of a random-access channel (RACH) preamble and a RACH payload;
determine at least one beam of the plurality of beams for transmitting a RACH message comprising a RACH preamble and a RACH payload, wherein the determination of the at least one beam is based on a receive signal quality parameter associated with one or more of the plurality of reference signals received using the at least one beam of the plurality of beams exceeding a threshold; and
transmit, to the wireless node, the RACH message comprising the RACH preamble and the RACH payload via the at least one beam, wherein the RACH preamble and the RACH payload are transmitted using the same beam, wherein the RACH preamble and the RACH payload are transmitted in different time or frequency resources, and wherein the RACH preamble and the RACH payload are transmitted based on the indicated sub-carrier resources.

20. The apparatus of claim 19, wherein the one or more processors are further configured to:
receive a random access response, wherein the RACH payload is transmitted before receiving the random access response.

21. The apparatus of claim 19, wherein the RACH payload is scrambled based on an identifier of the RACH preamble.

22. The apparatus of claim 19, wherein the RACH payload comprises a UE identifier (ID).

23. The apparatus of claim 19, wherein the one or more processors are further configured to:
determine a number of steps for a RACH procedure based on the receive signal quality parameter corresponding to the at least one of the plurality of beams, wherein the RACH preamble and the RACH payload are transmitted based on the determined number of steps.

24. The apparatus of claim 23, wherein:
the RACH procedure comprises a two-step RACH procedure if the receive signal quality parameter of at least two of the plurality of beams is determined to be acceptable by comparing the receive signal quality parameter to the threshold; and
the RACH preamble is transmitted via a first beam of the at least two beams and the RACH payload is transmitted via a second beam of the at least two beams.

25. The apparatus of claim 23, wherein:
the RACH procedure comprises a two-step RACH procedure if the receive signal quality parameter of a single beam of the plurality of beams is determined to be acceptable by comparing the receive signal quality parameter to the threshold; and
the RACH preamble and RACH payload are transmitted via the single beam having the acceptable signal quality and using different frequency resources.

26. The apparatus of claim 19, wherein total resources for receiving the RACH preamble and the RACH payload is fixed.

27. The apparatus of claim 26, wherein the indication comprises an indication of a resource split between the RACH preamble and the RACH payload.

28. The apparatus of claim 19, wherein the indication received as part of at least one of a master information block (MIB), system information block (SIB), or minimum SIB message.

29. The apparatus of claim 28, wherein the minimum SIB comprises minimum SIB information for conveying a RACH configuration.

* * * * *